(12) United States Patent
Nurminen et al.

(10) Patent No.: US 12,386,075 B2
(45) Date of Patent: Aug. 12, 2025

(54) MITIGATING EFFECTS OF LARGE-AREA GNSS SPOOFING AND/OR JAMMING ON CROWD-SOURCING-BASED MAP UPDATES

(71) Applicant: HERE Global B.V., Eindhoven (NL)

(72) Inventors: Henri Nurminen, Tampere (FI); Pavel Ivanov, Tampere (FI); Marko Luomi, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 329 days.

(21) Appl. No.: 18/307,236

(22) Filed: Apr. 26, 2023

(65) Prior Publication Data

US 2024/0361465 A1    Oct. 31, 2024

(51) Int. Cl.
*G01S 19/01*   (2010.01)
*G01S 19/07*   (2010.01)

(52) U.S. Cl.
CPC ............ *G01S 19/015* (2013.01); *G01S 19/07* (2013.01)

(58) Field of Classification Search
CPC ............................... G01S 19/015; G01S 19/07
USPC ........................................................... 342/14
See application file for complete search history.

(56) References Cited

U.S. PATENT DOCUMENTS

| 9,400,330 B2 | 7/2016 | Achanta et al. |
| 2015/0212192 A1 | 7/2015 | Chen et al. |
| 2020/0027265 A1* | 1/2020 | Levy ................. G06T 11/206 |
| 2020/0205004 A1 | 6/2020 | Wirola et al. |
| 2023/0093158 A1* | 3/2023 | Ivanov ............... G01S 5/02526 342/457 |

(Continued)

FOREIGN PATENT DOCUMENTS

| CN | 113587948 A | 11/2021 |
| CN | 115931033 A * | 4/2023 |
| KR | 20190037028 A | 4/2019 |

OTHER PUBLICATIONS

US 11,290,887 B2, 03/2022, Wirola et al. (withdrawn)

(Continued)

*Primary Examiner* — William Kelleher
*Assistant Examiner* — Samarina Makhdoom
(74) *Attorney, Agent, or Firm* — Jeffrey R. Moisan; HERE GLOBAL B.V.

(57) ABSTRACT

An apparatus obtains instances of crowd-sourced data corresponding to a first time period and determines a respective corroboration score based on map data a respective instance of crowd-sourced data. The apparatus determines a first representative corroboration score for the first time period based on respective corroboration scores determined for the instances of crowd-sourced data corresponding to the first time period; and compares the first representative corroboration score for the first time period to a second representative corroboration score corresponding to a second time period, wherein the first time period is different from the second time period. Based on a result of comparing the first and second representative corroboration scores, the apparatus determines whether the instances of crowd-sourced data are potentially manipulated. Responsive to determining that the instances of crowd-sourced data are potentially manipulated, the apparatus performs at least one mitigating action.

20 Claims, 10 Drawing Sheets

(56) References Cited

U.S. PATENT DOCUMENTS

2023/0118946 A1\* 4/2023 Bennington ............ H04L 69/04
342/357.45

OTHER PUBLICATIONS

Yozevitch et al "Save Our Roads from GNSS Jamming: A Crowdsource Framework for Threat Evaluation," Sensors 2021, 21, 4840. https://doi.org/10.3390/s21144840 (Year: 2021).\*
Strizic et al, "Crowdsourcing GNSS Jamming Detection and Localization," Proceedings of the 2018 International Technical Meeting of The Institute of Navigation, Jan. 1-29, 2018 (Year: 2018).\*
Wang et al., "A Survey of Spoofer Detection Techniques via Radio Frequency Fingerprinting with Focus on the GNSS Pre-Correlation Sampled Data", Sensors 2021, 21(9), (Apr. 25, 2021), 36 pages.

\* cited by examiner

MITIGATING EFFECTS OF LARGE-AREA GNSS SPOOFING AND/OR JAMMING ON CROWD-SOURCING-BASED MAP UPDATES

TECHNOLOGICAL FIELD

An example embodiment relates to crowd-sourcing-based map updates. An example embodiment relates to determining whether crowd-sourcing-based data may be potentially manipulated by large-area global navigation satellite system (GNSS) spoofing and/or jamming, for example, and, in response to determining that the crowd-sourcing-based data is potentially manipulated, modifying the updating of a map based on the crowd-sourcing-based data.

BACKGROUND

In large-area global navigation satellite system (GNSS) spoofing, a hostile party covers large areas (e.g., with a radius or other size scale of tens or hundreds of kilometers) with bogus GNSS-like radio signals that mask the real GNSS signals, causing GNSS receivers to report false positions in the spoofing operation's coverage area. GNSS spoofing causes a multitude of problems. For example, crowd-sourced data captured in the spoofing operation's coverage area includes location estimates including spoofed GNSS-based location estimates. Thus, the crowd-sourced data captured in the spoofing operation's coverage area may not provide an accurate representation of observed features. Therefore, a problem exists as to how to mitigate the effects of large-area GNSS spoofing and/or jamming on crowd-sourced data.

BRIEF SUMMARY

Various embodiments provide methods, apparatus, systems, and computer program products for mitigating the effects of large area GNSS spoofing and/or jamming on digital maps updated based on crowd-sourced data. Various embodiments provide methods, apparatus, systems, and computer program products for identifying time periods and areas within which large-area GNSS spoofing and/or jamming may be occurring/have occurred.

In various embodiments, instances of crowd-sourced data corresponding to a time period and an area are obtained by, for example, a server. Each instance of crowd-sourced data includes a respective location estimate and observation data. A respective corroboration score is determined for each instance of crowd-sourced data based on how well the respective location estimate and observation data of the respective instance of crowd-sourced data corroborates or agrees with the map data of the digital map. A representative corroboration score for the time period and the area is determined based on the respective corroboration scores. In response to determining that the representative corroboration score for the time period and the area indicates significantly or substantially poorer corroboration and/or agreement between the instances of crowd-sourced data of the time period and the digital map compared to one or more previous time periods, it is determined that the instances of crowd-sourced data are potentially manipulated. For example, if the representative corroboration score indicates a degradation in the corroboration and/or agreement between instances of crowd-sourced data captured/generated in a first time period compared to previous time periods, it is determined that potential manipulation of GNSS signals (e.g., spoofing and/or jamming) may have occurred in the area during the first time period.

Responsive to determining that instances of crowd-sourced data captured and/or generated during a first time period in an area are potentially manipulated, actions may be taken to mitigate the effects on a digital map updated based on crowd-sourced data. For example, the digital map may be reverted back to a version of the digital map from before the instances of crowd-sourced data captured and/or generated during the first time period in the area were used to update the map. In another example, the digital map may not be updated based on the instances of crowd-sourced data captured and/or generated during the first time period in the area until after it is determined that the instances of crowd-sourced data are not potentially manipulated.

In an example embodiment, a processor obtains one or more instances of crowd-sourced data corresponding to a first time period. A respective instance of crowd-sourced data of the one or more instances of crowd-sourced data was generated by a respective mobile apparatus during the first time period. The respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus. For each of the one or more instances of crowd-sourced data, the processor determines a respective corroboration score based at least in part on map data stored in a memory accessible to the processor and at least one of the respective first location estimate or the observation data of the respective instance of crowd-sourced data. The processor determines a first representative corroboration score for the first time period based on respective corroboration scores determined for the one or more instances of crowd-sourced data corresponding to the first time period; and compares the first representative corroboration score for the first time period to a second representative corroboration score corresponding to a second time period. The first time period is different from the second time period. Based on a result of comparing the first representative corroboration score and the second representative corroboration score, the processor determines whether one or more respective first location estimates of the one or more instances of crowd-sourced data are potentially manipulated. Responsive to determining that the one or more respective first location estimates of the one or more instances of crowd-sourced data are potentially manipulated, the processor performs at least one mitigating action.

According to an aspect of the present disclosure, a method for mitigating the effects of large-area GNSS spoofing and/or jamming on a digital map updated based on crowd-sourced data is provided. In an example embodiment, the method comprises obtaining, by at least one processor, one or more instances of crowd-sourced data corresponding to a first time period. A respective instance of crowd-sourced data of the one or more instances of crowd-sourced data was generated by a respective mobile apparatus during the first time period. The respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus. The method further comprises for each of the one or more instances of crowd-sourced data, determining, by the at least one processor, a respective corroboration score based at least in part on map data stored in a memory accessible to the at least one processor and at least one of the respective first location estimate or the observation data of the respective instance of crowd-sourced data. The method further comprises determining, by the at least one processor, a first representative corroboration score for the first time period based on respective corroboration scores determined for the one or more instances of crowd-sourced data corresponding to the first time period; and comparing, by the at least one processor, the first representative corroboration score for the first time period to a second representative corroboration score corresponding to a second time period. The first time period is different from the second time period. The method further comprises, based on a result of comparing the first representative corroboration score and the second representative corroboration score, determining, by the at least one processor, whether one or more respective first location estimates of the one or more instances of crowd-sourced data are potentially manipulated. The method further comprises, responsive to determining that the one or more respective first location estimates of the one or more instances of crowd-sourced data are potentially manipulated, performing, by the at least one processor, at least one mitigating action.

In an example embodiment, the at least one mitigating action comprises at least one of (a) preventing the use of the one or more instances of crowd-sourced data from being used to update the map data or (b) reverting an effect of using the one or more instances of crowd-source data to update the map data.

In an example embodiment, the respective corroboration score for the respective instance of crowd-sourced data is determined at least in part based on a cross-validation between the respective first location estimate and a second location estimate determined at least in part based on the map data and the observation data of the respective instance of crowd-sourced data.

In an example embodiment, the respective corroboration score for the respective instance of crowd-sourced data is determined at least in part based on a cross-validation between at least a portion of the observation data of the respective instance of crowd-sourced data corresponding to a particular feature and map data corresponding to the feature.

In an example embodiment, the first representative corroboration score is determined based on a first distribution of respective corroboration scores and the second representative corroboration score was determined based on a second distribution of respective corroboration scores that were determined for respective instances of crowd-sourced data corresponding to the second time period.

In an example embodiment, the at least one processor determines that the one or more respective first location estimates of the one or more instances of crowd-sourced data are potentially manipulated responsive to determining that the first representative corroboration score indicates substantially less corroboration between the map data and the at least one of the first location estimate or the observation data of the one or more instances of crowd-sourced data corresponding to the first time period than the second representative corroboration score.

In an example embodiment, determining that the first representative corroboration score indicates substantially less corroboration between the map data and the at least one of the first location estimate or the observation data of the one or more instances of crowd-sourced data corresponding to the first time period than the second representative corroboration score comprises at least one of (a) determining that the first representative distribution score and the second representative distribution score are statistically different from one another or (b) determining that the first distribution of corroboration scores is a statistically different distribution from the second distribution of corroboration scores.

In an example embodiment, the at least one processor determines that the one or more respective first location estimates of the one or more instances of crowd-sourced data are potentially manipulated responsive to determining that a difference between the first representative corroboration score and the second representative corroboration score satisfies a threshold requirement.

In an example embodiment, the first time period and the second time period are non-overlapping periods of time.

In an example embodiment, the one or more instances of crowd-sourced data correspond to a common defined geographical and/or geopolitical area.

In an example embodiment, the observation data is a radio fingerprint corresponding to observation of one or more radio nodes observed by a radio interface of the respective mobile apparatus.

In an example embodiment, performing, by the at least one processor, at least one of (a) preventing the use of the one or more instances of crowd-sourced data from being used to update the map data or (b) reverting an effect of using the one or more instances of crowd-source data to update the map data comprises at least one of reverting the map data to a state of the map data prior to the beginning of the first time period; or waiting until after a determination of whether one or more respective first location estimates of the one or more instances of crowd-sourced data are potentially manipulated before using the one or more instances of crowd-sourced data to update the map data and not using the one or more instances of crowd-sourced data to update the map data responsive to determining that the one or more respective first location estimates are potentially manipulated.

In an example embodiment, the method further comprises, responsive to determining that the one or more respective first location estimates of the one or more instances of crowd-sourced data are potentially manipulated, providing a notification of potential manipulation of location estimates to an authority computing entity or a media computing entity.

In an example embodiment, the method further comprises, responsive to determining that the one or more respective first location estimates of the one or more instances of crowd-sourced data are potentially manipulated, determining whether to provide a notification based at least in part on one or more received reports of potential manipulation generated by respective mobile devices during the first time period; and responsive to determining to provide the notification, providing the notification of potential manipulation of location estimates to an authority computing entity or a media computing entity.

In an example embodiment, the method further comprises analyzing respective first location estimates of the one or more instances of crowd-sourced data using a clustering algorithm to identify one or more areas associated with the potential manipulation of the one or more respective first location estimates.

In an example embodiment, the method further comprises determining respective error vectors based on the respective first location estimates of the one or more instances of crowd-sourced data corresponding to the first time period and respective second location estimates determined at least in part based on the map data and the observation data of the one or more instances of crowd-sourced data; and determining one or more error patterns based on analyzing the respective error vectors.

In an example embodiment, the method further comprises generating a location estimate correction based on the one or more error patterns; generating respective corrected location estimates by correcting the respective first location estimates of the one or more instances of crowd-sourced data corresponding to the first time period based on the location estimate correction; and generating updated map data using the respective corrected location estimates and the one or more instances of crowd-sourced data.

In an example embodiment, the method further comprises responsive to determining that the respective instance of crowd-sourced data comprises an indication of an expected potentially poor corroboration between the respective instance of crowd-sourced data and the map data, excluding the respective instance of crowd-sourced data from a determination of the first representative corroboration score.

In an example embodiment, the one or more respective first location estimates of the one or more instances of crowd-sourced data are potentially manipulated via global navigation satellite system (GNSS) spoofing or jamming.

According to another aspect of the present disclosure, an apparatus is provided. In an example embodiment, the apparatus comprises at least one processor and at least one memory storing computer program code and/or instructions. The at least one memory and the computer program code and/or instructions are configured to, with the processor, cause the apparatus to at least obtain one or more instances of crowd-sourced data corresponding to a first time period. A respective instance of crowd-sourced data of the one or more instances of crowd-sourced data was generated by a respective mobile apparatus during the first time period. The respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus. The at least one memory and the computer program code and/or instructions are further configured to, with the processor, cause the apparatus to at least, for each of the one or more instances of crowd-sourced data, determine a respective corroboration score based at least in part on map data stored in a memory accessible to the at least one processor and at least one of the respective first location estimate or the observation data of the respective instance of crowd-sourced data. The at least one memory and the computer program code and/or instructions are further configured to, with the processor, cause the apparatus to at least determine a first representative corroboration score for the first time period based on respective corroboration scores determined for the one or more instances of crowd-sourced data corresponding to the first time period; and compare the first representative corroboration score for the first time period to a second representative corroboration score corresponding to a second time period. The first time period is different from the second time period. The at least one memory and the computer program code and/or instructions are further configured to, with the processor, cause the apparatus to at least, based on a result of comparing the first representative corroboration score and the second representative corroboration score, determine whether one or more respective first location estimates of the one or more instances of crowd-sourced data are potentially manipulated. The at least one memory and the computer program code and/or instructions are further configured to, with the processor, cause the apparatus to at least, responsive to determining that the one or more respective first location estimates of the one or more instances of crowd-sourced data are potentially manipulated, perform at least one mitigating action.

In an example embodiment, the at least one mitigating action is at least one of (a) preventing the use of the one or more instances of crowd-sourced data from being used to update the map data or (b) reverting an effect of using the one or more instances of crowd-source data to update the map data.

In an example embodiment, the respective corroboration score for the respective instance of crowd-sourced data is determined at least in part based on a cross-validation between the respective first location estimate and a second location estimate determined at least in part based on the map data and the observation data of the respective instance of crowd-sourced data.

In an example embodiment, the respective corroboration score for the respective instance of crowd-sourced data is determined at least in part based on a cross-validation between at least a portion of the observation data of the respective instance of crowd-sourced data corresponding to a particular feature and map data corresponding to the feature.

In an example embodiment, the first representative corroboration score is determined based on a first distribution of respective corroboration scores and the second representative corroboration score was determined based on a second distribution of respective corroboration scores that were determined for respective instances of crowd-sourced data corresponding to the second time period.

In an example embodiment, the apparatus determines that the one or more respective first location estimates of the one or more instances of crowd-sourced data are potentially manipulated responsive to determining that the first representative corroboration score indicates substantially less corroboration between the map data and the at least one of the first location estimate or the observation data of the one or more instances of crowd-sourced data corresponding to the first time period than the second representative corroboration score.

In an example embodiment, determining that the first representative corroboration score indicates substantially less corroboration between the map data and the at least one of the first location estimate or the observation data of the one or more instances of crowd-sourced data corresponding to the first time period than the second representative corroboration score comprises at least one of (a) determining that the first representative distribution score and the second representative distribution score are statistically different from one another or (b) determining that the first distribution of corroboration scores is a statistically different distribution from the second distribution of corroboration scores.

In an example embodiment, the apparatus determines that the one or more respective first location estimates of the one or more instances of crowd-sourced data are potentially manipulated responsive to determining that a difference between the first representative corroboration score and the second representative corroboration score satisfies a threshold requirement.

In an example embodiment, the first time period and the second time period are non-overlapping periods of time.

In an example embodiment, the one or more instances of crowd-sourced data correspond to a common defined geographical and/or geopolitical area.

In an example embodiment, the observation data is a radio fingerprint corresponding to observation of one or more radio nodes observed by a radio interface of the respective mobile apparatus.

In an example embodiment, performing at least one mitigating action comprises at least one of reverting the map data to a state of the map data prior to the beginning of the first time period; or waiting until after a determination of whether one or more respective first location estimates of the one or more instances of crowd-sourced data are potentially manipulated before using the one or more instances of crowd-sourced data to update the map data and not using the one or more instances of crowd-sourced data to update the map data responsive to determining that the one or more respective first location estimates are potentially manipulated.

In an example embodiment, the at least one memory and the computer program code and/or instructions are further configured to, with the processor, cause the apparatus to at least, responsive to determining that the one or more respective first location estimates of the one or more instances of crowd-sourced data are potentially manipulated, provide a notification of potential manipulation of location estimates to an authority computing entity or a media computing entity.

In an example embodiment, the at least one memory and the computer program code and/or instructions are further configured to, with the processor, cause the apparatus to at least, responsive to determining that the one or more respective first location estimates of the one or more instances of crowd-sourced data are potentially manipulated, determine whether to provide a notification based at least in part on one or more received reports of potential manipulation generated by respective mobile devices during the first time period; and responsive to determining to provide the notification, provide the notification of potential manipulation of location estimates to an authority computing entity or a media computing entity.

In an example embodiment, the at least one memory and the computer program code and/or instructions are further configured to, with the processor, cause the apparatus to at least analyze respective first location estimates of the one or more instances of crowd-sourced data using a clustering algorithm to identify one or more areas associated with the potential manipulation of the one or more respective first location estimates.

In an example embodiment, the at least one memory and the computer program code and/or instructions are further configured to, with the processor, cause the apparatus to at least determine respective error vectors based on the respective first location estimates of the one or more instances of crowd-sourced data corresponding to the first time period and respective second location estimates determined at least in part based on the map data and the observation data of the one or more instances of crowd-sourced data; and determine one or more error patterns based on analyzing the respective error vectors.

In an example embodiment the at least one memory and the computer program code and/or instructions are further configured to, with the processor, cause the apparatus to at least generate a location estimate correction based on the one or more error patterns; generate respective corrected location estimates by correcting the respective first location estimates of the one or more instances of crowd-sourced data corresponding to the first time period based on the location estimate correction; and generate updated map data using the respective corrected location estimates and the one or more instances of crowd-sourced data.

In an example embodiment, responsive to determining that the respective instance of crowd-sourced data comprises an indication of an expected potentially poor corroboration between the respective instance of crowd-sourced data and the map data, the apparatus excludes the respective instance of crowd-sourced data from a determination of the first representative corroboration score.

In an example embodiment, the one or more respective first location estimates of the one or more instances of crowd-sourced data are potentially manipulated via global navigation satellite system (GNSS) spoofing or jamming.

In still another aspect of the present disclosure, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to obtain one or more instances of crowd-sourced data corresponding to a first time period. A respective instance of crowd-sourced data of the one or more instances of crowd-sourced data was generated by a respective mobile apparatus during the first time period. The respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus. The computer-readable program code and/or instructions portions comprise executable portions further configured, when executed by a processor of an apparatus, to cause the apparatus to, for each of the one or more instances of crowd-sourced data, determine a respective corroboration score based at least in part on map data stored in a memory accessible to the at least one processor and at least one of the respective first location estimate or the observation data of the respective instance of crowd-sourced data. The computer-readable program code and/or instructions portions comprise executable portions further configured, when executed by a processor of an apparatus, to cause the apparatus to determine a first representative corroboration score for the first time period based on respective corroboration scores determined for the one or more instances of crowd-sourced data corresponding to the first time period; and compare the first representative corroboration score for the first time period to a second representative corroboration score corresponding to a second time period. The first time period is different from the second time period. The computer-readable program code and/or instructions portions comprise executable portions further configured, when executed by a processor of an apparatus, to cause the apparatus to, based on a result of comparing the first representative corroboration score and the second representative corroboration score, determine whether one or more respective first location estimates of the one or more instances of crowd-sourced data are potentially manipulated. The computer-readable program code and/or instructions portions comprise executable portions further configured, when executed by a processor of an apparatus, to cause the apparatus to, responsive to determining that the one or more respective first location estimates of the one or more instances of crowd-sourced data are potentially manipulated, perform at least one mitigating action.

In an example embodiment, the at least one mitigating action is at least one of (a) preventing the use of the one or more instances of crowd-sourced data from being used to update the map data or (b) reverting an effect of using the one or more instances of crowd-source data to update the map data.

In an example embodiment, the respective corroboration score for the respective instance of crowd-sourced data is determined at least in part based on a cross-validation between the respective first location estimate and a second location estimate determined at least in part based on the map data and the observation data of the respective instance of crowd-sourced data.

In an example embodiment, the respective corroboration score for the respective instance of crowd-sourced data is determined at least in part based on a cross-validation between at least a portion of the observation data of the respective instance of crowd-sourced data corresponding to a particular feature and map data corresponding to the feature.

In an example embodiment, the first representative corroboration score is determined based on a first distribution of respective corroboration scores and the second representative corroboration score was determined based on a second distribution of respective corroboration scores that were determined for respective instances of crowd-sourced data corresponding to the second time period.

In an example embodiment, the apparatus determines that the one or more respective first location estimates of the one or more instances of crowd-sourced data are potentially manipulated responsive to determining that the first representative corroboration score indicates substantially less corroboration between the map data and the at least one of the first location estimate or the observation data of the one or more instances of crowd-sourced data corresponding to the first time period than the second representative corroboration score.

In an example embodiment, determining that the first representative corroboration score indicates substantially less corroboration between the map data and the at least one of the first location estimate or the observation data of the one or more instances of crowd-sourced data corresponding to the first time period than the second representative corroboration score comprises at least one of (a) determining that the first representative distribution score and the second representative distribution score are statistically different from one another or (b) determining that the first distribution of corroboration scores is a statistically different distribution from the second distribution of corroboration scores.

In an example embodiment, the apparatus determines that the one or more respective first location estimates of the one or more instances of crowd-sourced data are potentially manipulated responsive to determining that a difference between the first representative corroboration score and the second representative corroboration score satisfies a threshold requirement.

In an example embodiment, the first time period and the second time period are non-overlapping periods of time.

In an example embodiment, the one or more instances of crowd-sourced data correspond to a common defined geographical and/or geopolitical area.

In an example embodiment, the observation data is a radio fingerprint corresponding to observation of one or more radio nodes observed by a radio interface of the respective mobile apparatus.

In an example embodiment, performing at least one mitigating action comprises at least one of reverting the map data to a state of the map data prior to the beginning of the first time period; or waiting until after a determination of whether one or more respective first location estimates of the one or more instances of crowd-sourced data are potentially manipulated before using the one or more instances of crowd-sourced data to update the map data and not using the one or more instances of crowd-sourced data to update the map data responsive to determining that the one or more respective first location estimates are potentially manipulated.

In an example embodiment, the computer-readable program code and/or instructions portions comprise executable portions further configured, when executed by a processor of an apparatus, to cause the apparatus to, responsive to determining that the one or more respective first location estimates of the one or more instances of crowd-sourced data are potentially manipulated, provide a notification of potential manipulation of location estimates to an authority computing entity or a media computing entity.

In an example embodiment, the computer-readable program code and/or instructions portions comprise executable portions further configured, when executed by a processor of an apparatus, to cause the apparatus to, responsive to determining that the one or more respective first location estimates of the one or more instances of crowd-sourced data are potentially manipulated, determine whether to provide a notification based at least in part on one or more received reports of potential manipulation generated by respective mobile devices during the first time period; and responsive to determining to provide the notification, provide the notification of potential manipulation of location estimates to an authority computing entity or a media computing entity.

In an example embodiment, the computer-readable program code and/or instructions portions comprise executable portions further configured, when executed by a processor of an apparatus, to cause the apparatus to analyze respective first location estimates of the one or more instances of crowd-sourced data using a clustering algorithm to identify one or more areas associated with the potential manipulation of the one or more respective first location estimates.

In an example embodiment, the computer-readable program code and/or instructions portions comprise executable portions further configured, when executed by a processor of an apparatus, to cause the apparatus to determine respective error vectors based on the respective first location estimates of the one or more instances of crowd-sourced data corresponding to the first time period and respective second location estimates determined at least in part based on the map data and the observation data of the one or more instances of crowd-sourced data; and determine one or more error patterns based on analyzing the respective error vectors.

In an example embodiment, the computer-readable program code and/or instructions portions comprise executable portions further configured, when executed by a processor of an apparatus, to cause the apparatus to generate a location estimate correction based on the one or more error patterns; generate respective corrected location estimates by correcting the respective first location estimates of the one or more instances of crowd-sourced data corresponding to the first time period based on the location estimate correction; and generate updated map data using the respective corrected location estimates and the one or more instances of crowd-sourced data.

In an example embodiment, responsive to determining that the respective instance of crowd-sourced data comprises an indication of an expected potentially poor corroboration between the respective instance of crowd-sourced data and the map data, the apparatus excludes the respective instance of crowd-sourced data from a determination of the first representative corroboration score.

In an example embodiment, the one or more respective first location estimates of the one or more instances of crowd-sourced data are potentially manipulated via global navigation satellite system (GNSS) spoofing or jamming.

According to yet another aspect, an apparatus is provided. In an example embodiment, the apparatus comprises means for obtaining one or more instances of crowd-sourced data corresponding to a first time period. A respective instance of crowd-sourced data of the one or more instances of crowd-sourced data was generated by a respective mobile apparatus during the first time period. The respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus. The apparatus comprises means for, for each of the one or more instances of crowd-sourced data, determining a respective corroboration score based at least in part on map data stored in a memory accessible to the at least one processor and at least one of the respective first location estimate or the observation data of the respective instance of crowd-sourced data. The apparatus comprises means for determining a first representative corroboration score for the first time period based on respective corroboration scores determined for the one or more instances of crowd-sourced data corresponding to the first time period. The apparatus comprises means for comparing the first representative corroboration score for the first time period to a second representative corroboration score corresponding to a second time period. The first time period is different from the second time period. The apparatus comprises means for, based on a result of comparing the first representative corroboration score and the second representative corroboration score, determining whether one or more respective first location estimates of the one or more instances of crowd-sourced data are potentially manipulated. The apparatus comprises means for, responsive to determining that the one or more respective first location estimates of the one or more instances of crowd-sourced data are potentially manipulated, performing at least one mitigating action.

BRIEF DESCRIPTION OF THE DRAWINGS

Figure 1:
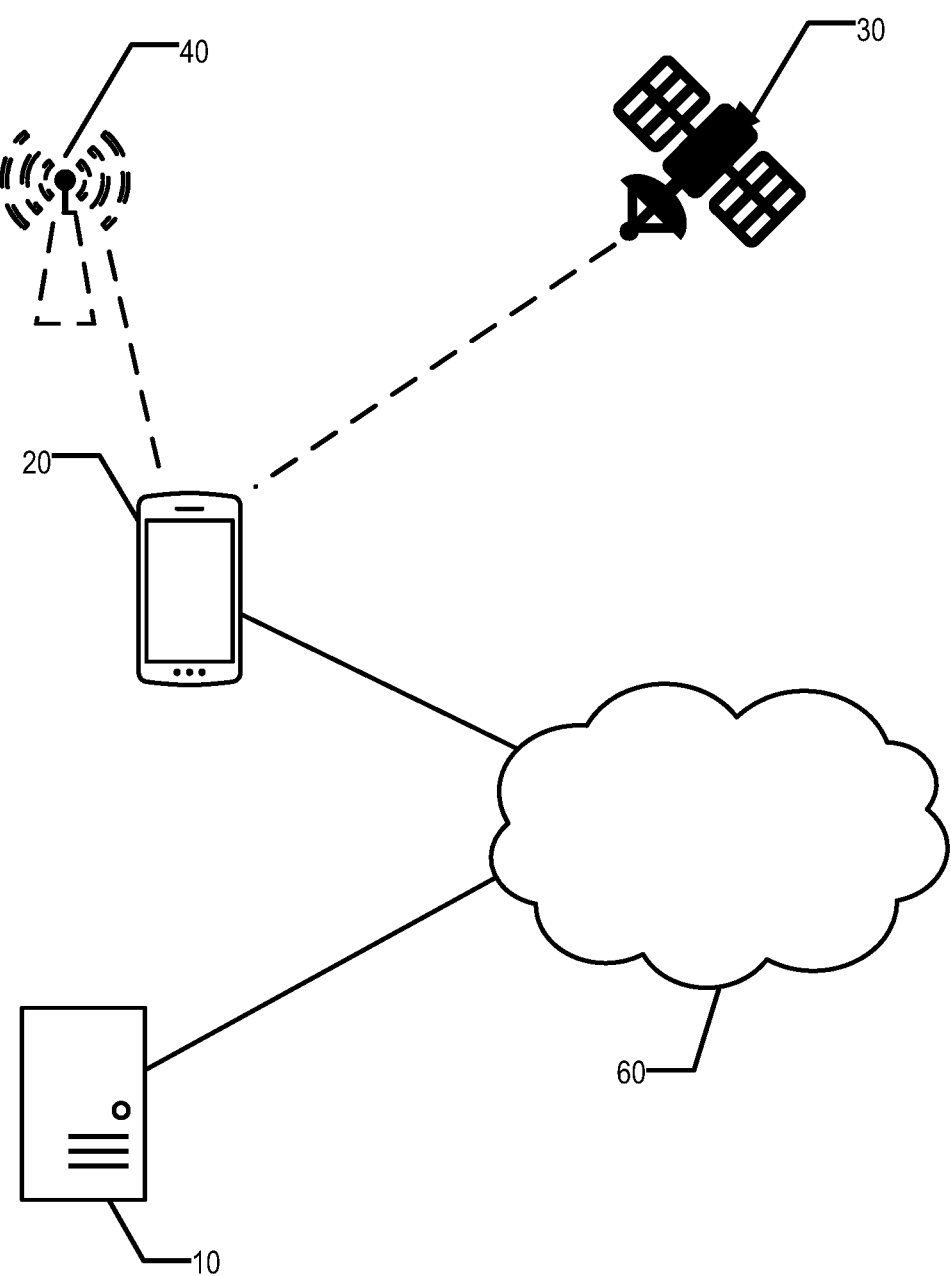
Figure 2A:
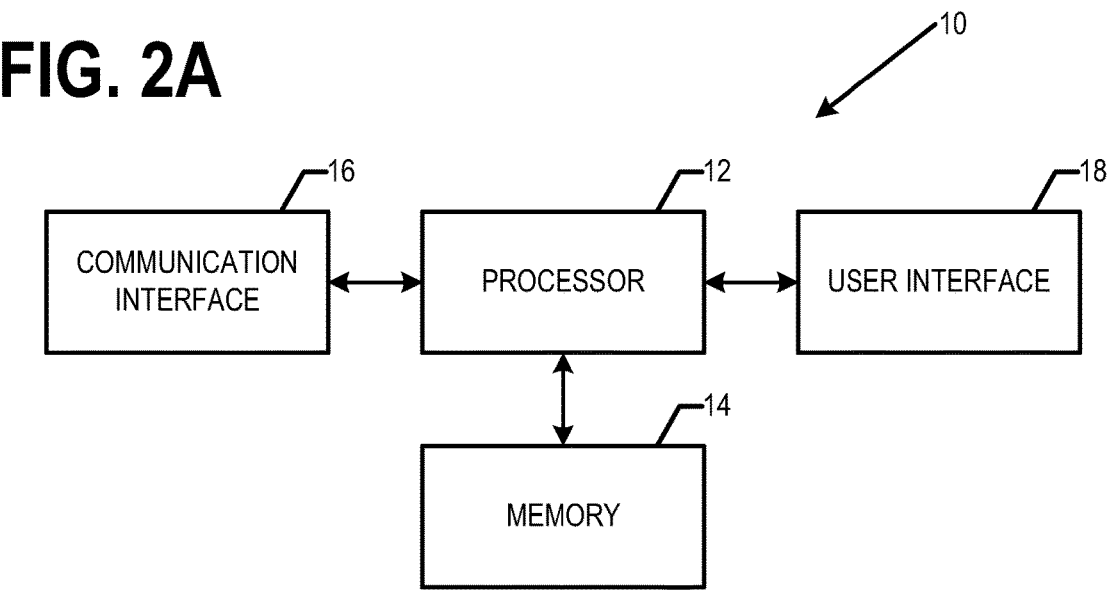
Figure 2B:
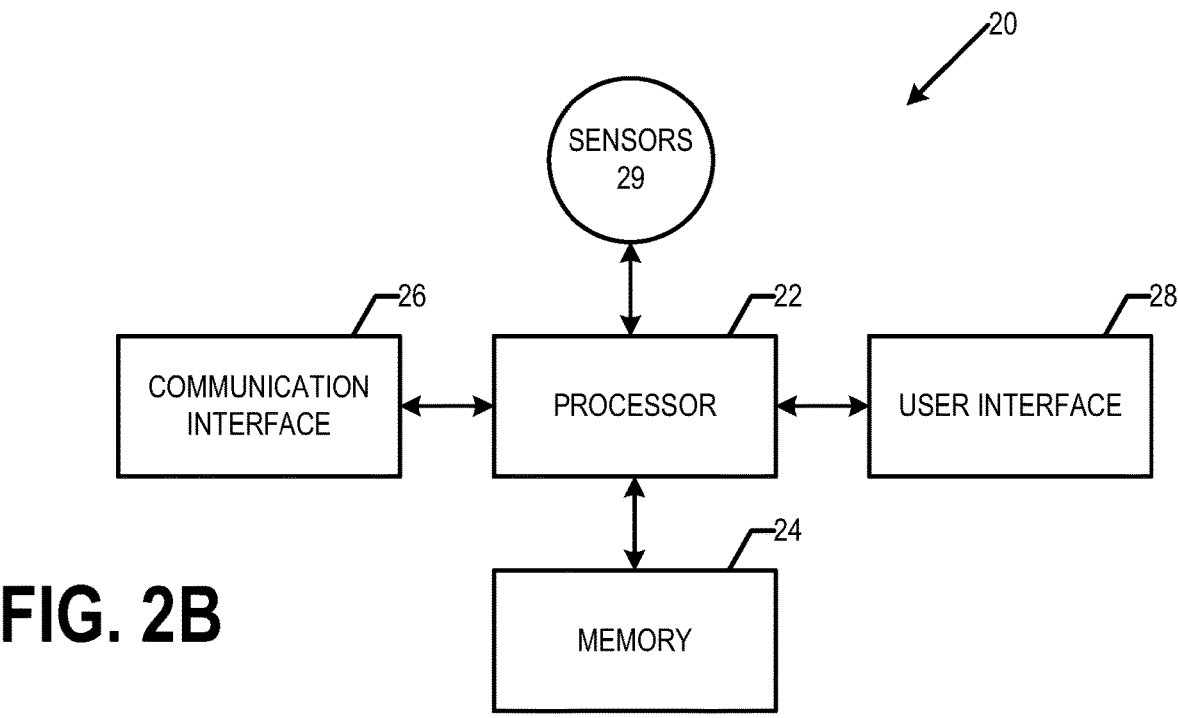
Figure 3:
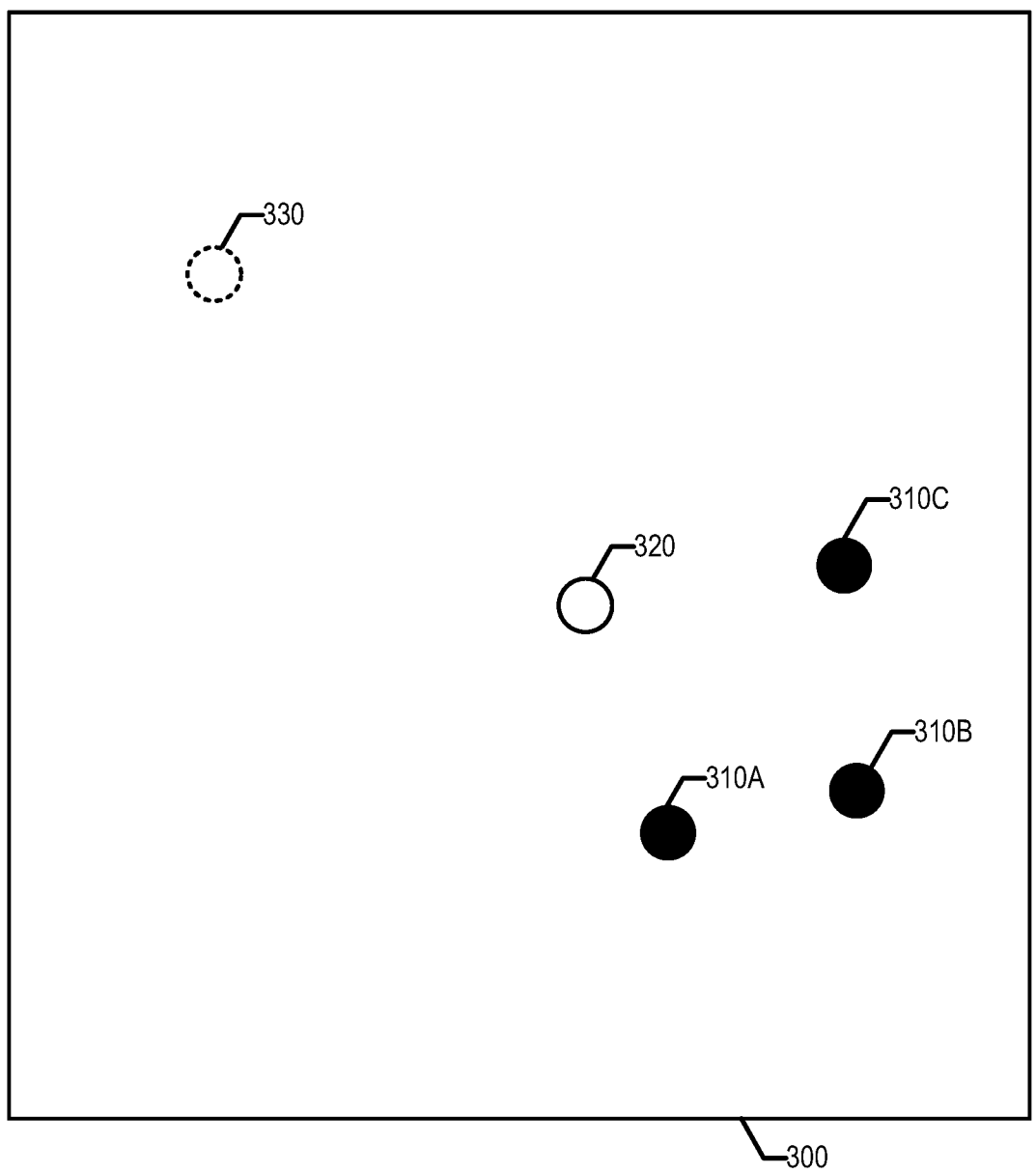
Figure 4:
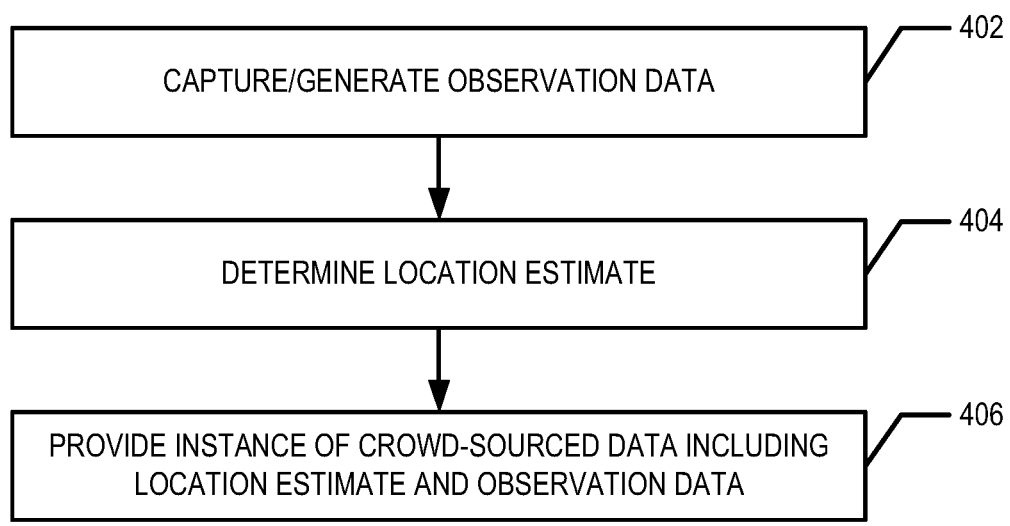
Figure 5:
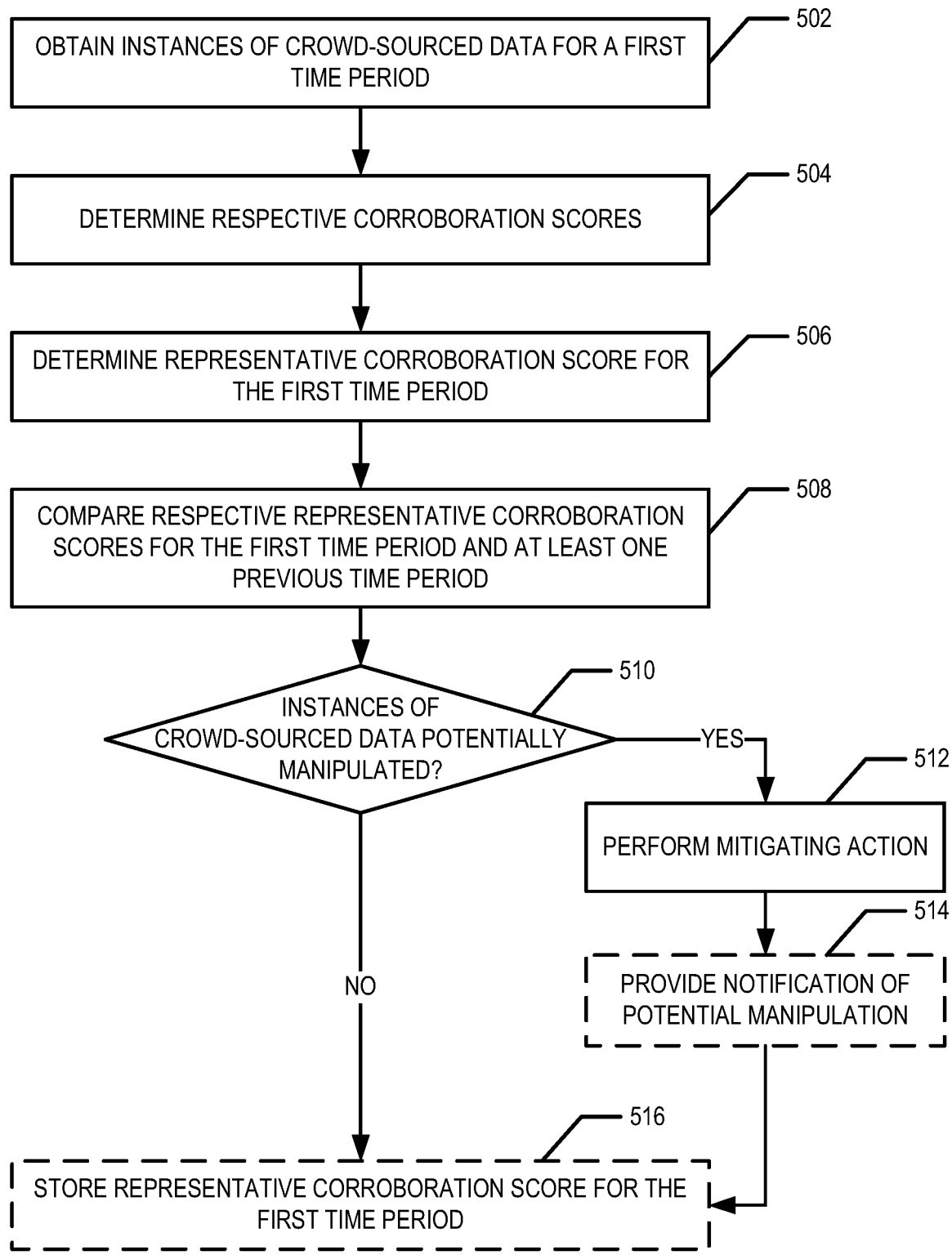
Figure 6A:
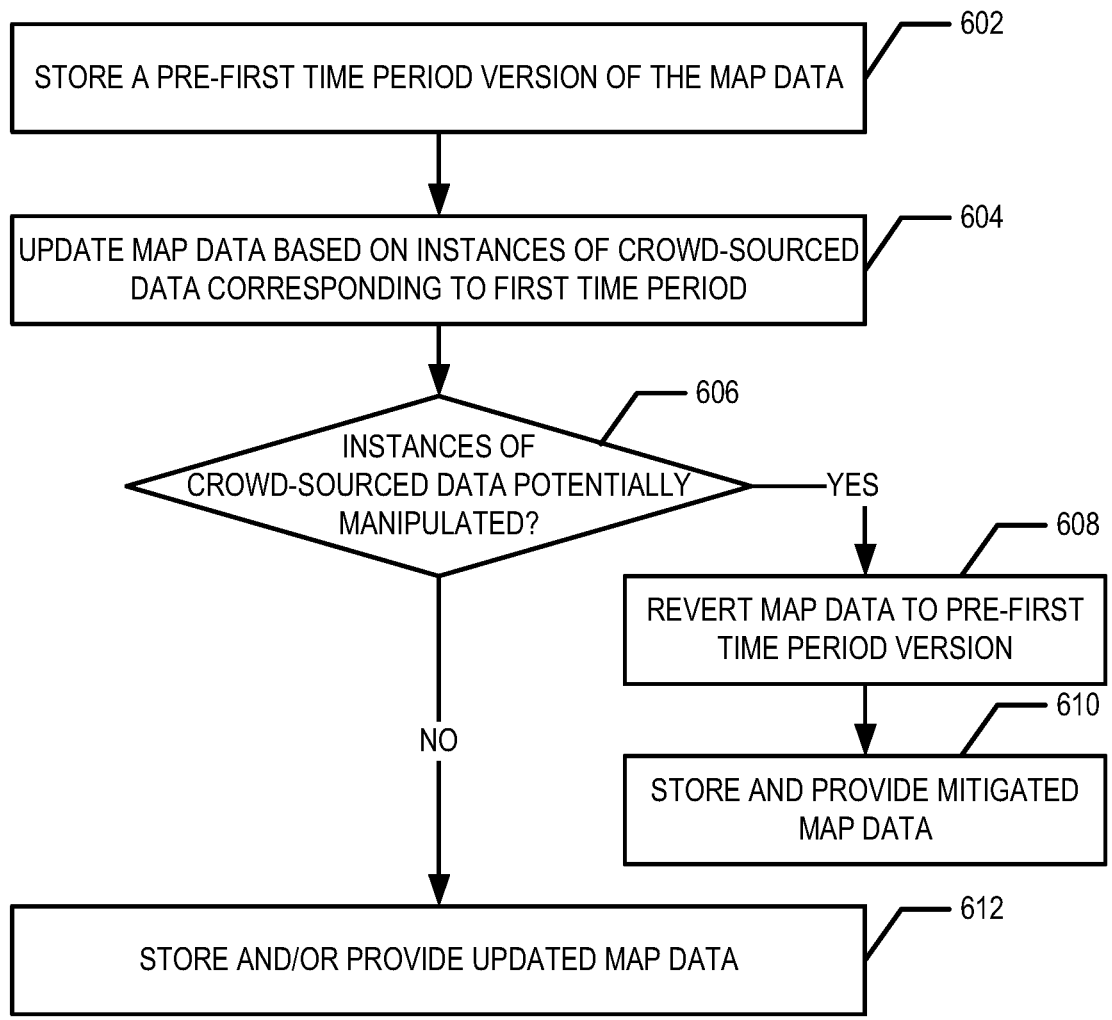
Figure 6B:
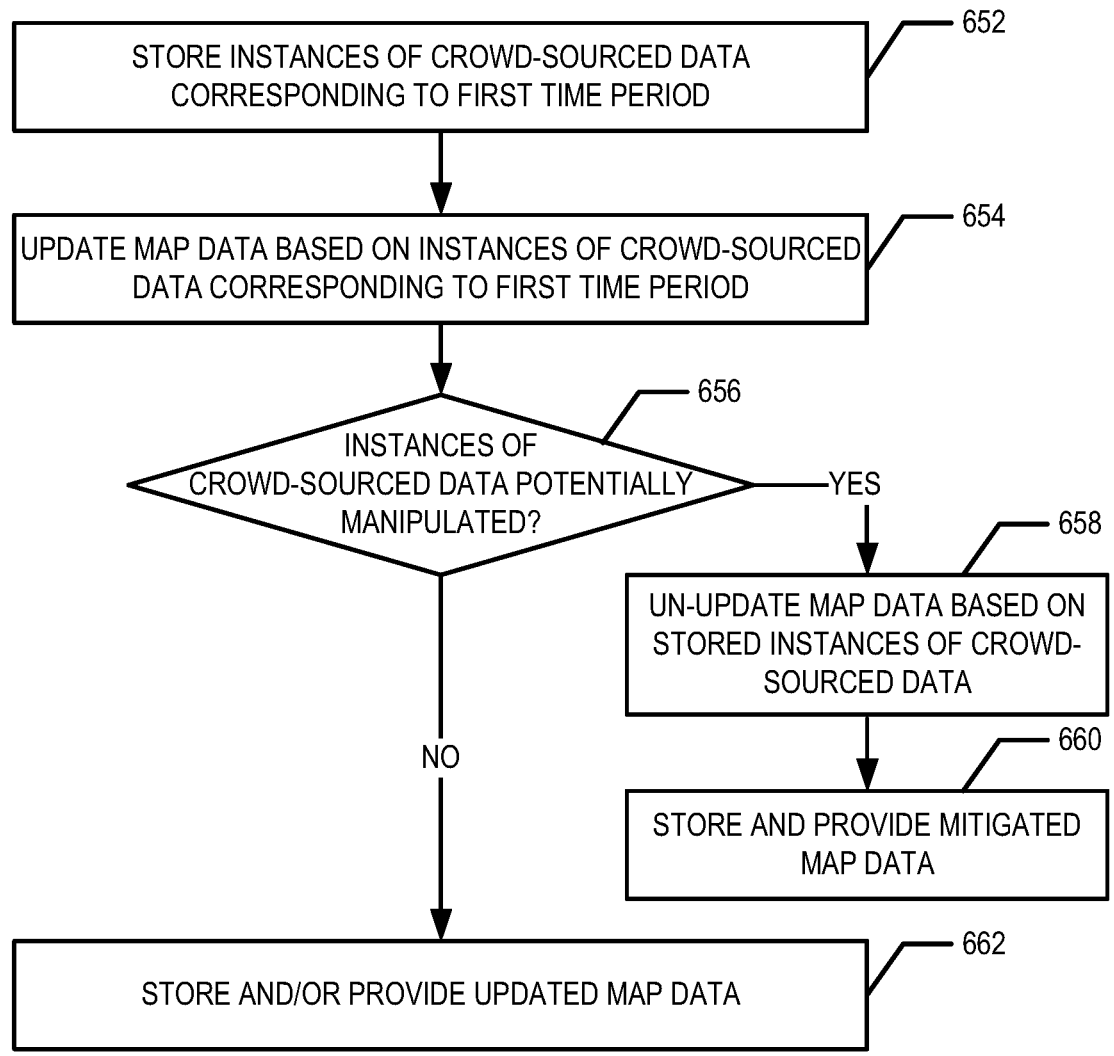
Figure 7:
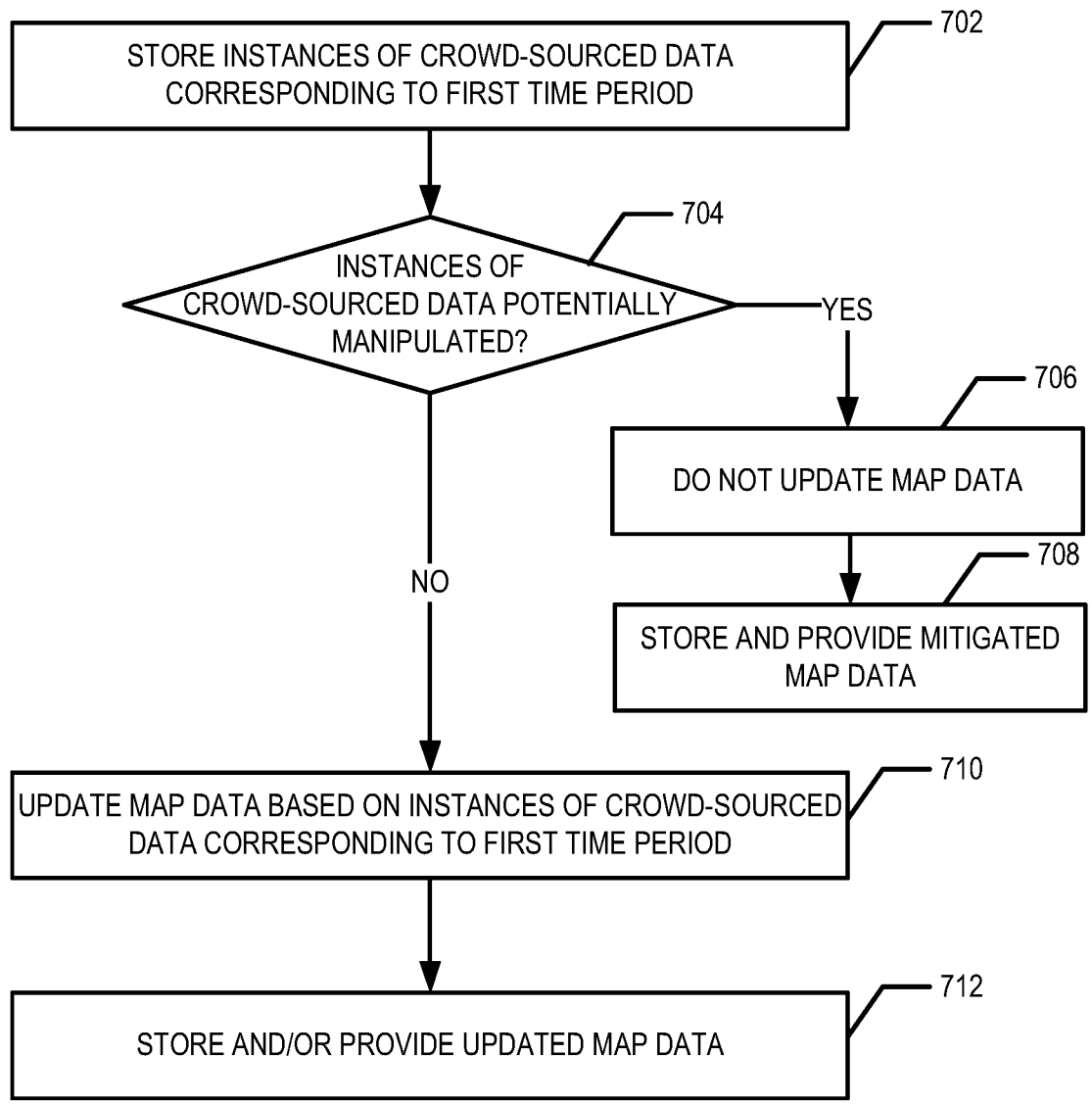
Figure 8:
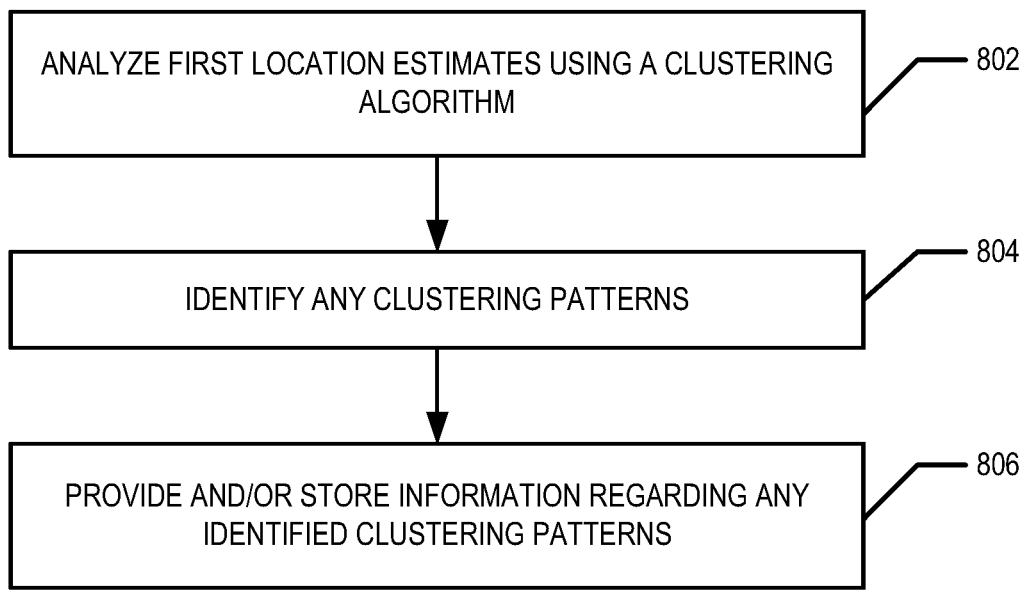
Figure 9:
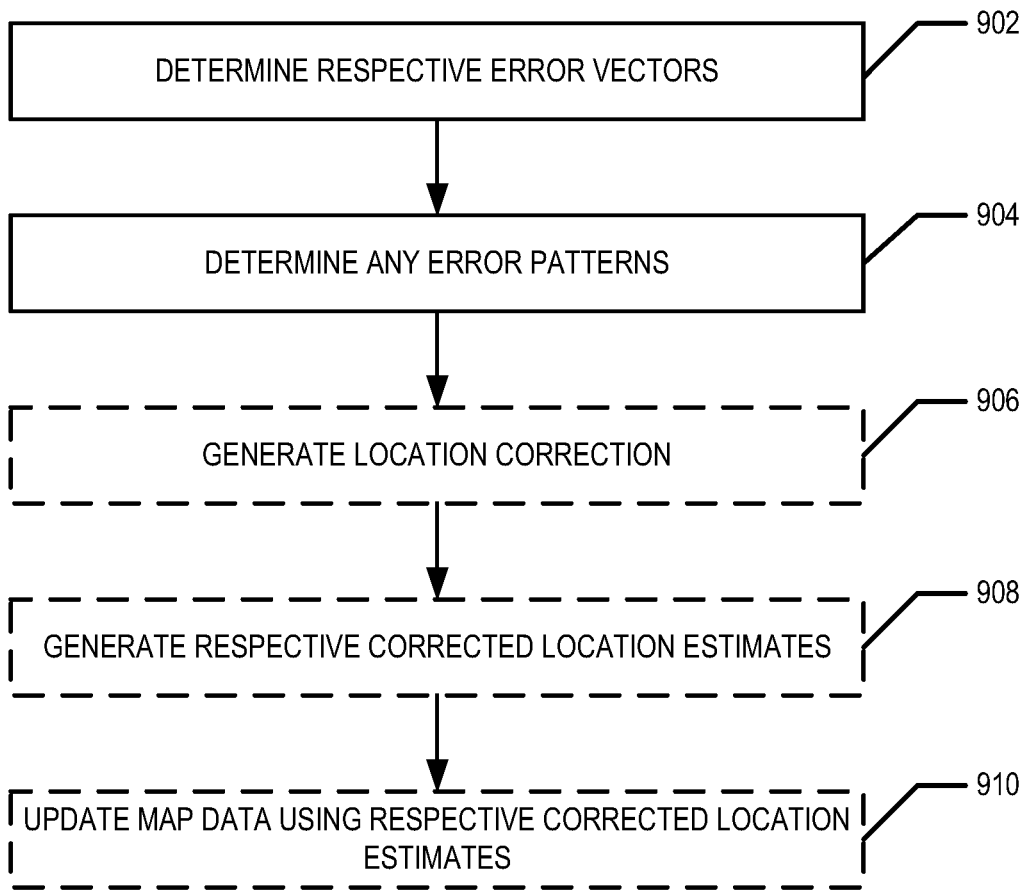

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network apparatus that may be specifically configured in accordance with an example embodiment;

FIG. 2B is a block diagram of a mobile apparatus that may be specifically configured in accordance with an example embodiment;

FIG. 3 is a conceptual diagram illustrating various features of various embodiments;

FIG. 4 is a flowchart illustrating operations performed, such as by the mobile apparatus of FIG. 2B, to provide an instance of crowd-sourced data, in accordance with an example embodiment;

FIG. 5 is a flowchart illustrating operations performed, such as by the network apparatus of FIG. 2A, to mitigate the effects of (large-area) GNSS spoofing and/or jamming on map data updated based on crowd-sourced data, in accordance with an example embodiment;

FIGS. 6A and 6B provide respective flowcharts illustrating operations performed, such as by the network apparatus of FIG. 2A, to revert the effect of using potentially manipulated instances of crowd-sourced data to update the map data, in accordance with an example embodiment;

FIG. 7 provides a flowchart illustrating operations performed, such as by the network apparatus of FIG. 2A, to prevent the use of potentially manipulated instances of crowd-sourced data for updating the map data, in accordance with an example embodiment;

FIG. 8 is a flowchart illustrating operations performed, such as by the network apparatus of FIG. 2A, to identify instances of potential constant-position spoofing, in accordance with an example embodiment; and FIG. 9 is a flowchart illustrating operations performed, such as by the network apparatus of FIG. 2A, to identify instances of potential constant-offset spoofing, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Various embodiments provide methods, apparatus, systems, and computer program products for mitigating the effects of large area GNSS spoofing and/or jamming on digital maps updated based on crowd-sourced data. Various embodiments provide methods, apparatus, systems, and computer program products for identifying time periods and areas within which large-area GNSS spoofing and/or jamming may be occurring/have occurred.

Conventional techniques for updating a digital map based on crowd-sourced data include receiving instances of crowd-sourced data and updating a digital map based on the crowd-sourced data. However, in such conventional techniques, it may not be known whether the crowd-sourced data is potentially manipulated or not. When potentially manipulated crowd-sourced data is used to update the digital map, errors may be introduced into the location or characteristics of various observed features. For example, when an instance of manipulated crowd-sourced data indicates an observed feature has a particular characteristic (e.g., a particular observed signal strength at a manipulated location estimate or a particular size or position when viewed from the manipulated location estimate) the particular characteristic of the feature may be misrepresentative of the actual characteristic of the feature. However, this misrepresentation of the feature may be added to the digital map. Therefore, technical problems exist regarding how to mitigate the effects of manipulation, such as large-area GNSS spoofing and/or jamming on crowd-sourced data and digital maps that are updated based on crowd-sourced data.

Various embodiments provide technical solutions to these technical problems. For example, in various embodiments, instances of crowd-sourced data corresponding to a time period and an area are obtained by, for example, a server or Cloud-based computing resource. Each instance of crowd-sourced data includes a respective location estimate and observation data. A respective corroboration score is determined for each instance of crowd-sourced data based on how well the respective location estimate and observation data of the respective instance of crowd-sourced data corroborates or agrees with the map data of the digital map. A representative corroboration score for the time period and the area is determined based on the respective corroboration scores. In response to determining that the representative corroboration score for the time period and the area indicates significantly or substantially poorer corroboration and/or agreement between the instances of crowd-sourced data of the time period and the digital map compared to one or more previous time periods, it is determined that the instances of crowd-sourced data are potentially manipulated. For example, if the representative corroboration score indicates a degradation in the corroboration and/or agreement between instances of crowd-sourced data captured/generated in a first time period compared to previous time periods, it is determined that potential manipulation of GNSS signals (e.g., spoofing and/or jamming) may have occurred in the area during the first time period.

Responsive to determining that instances of crowd-sourced data captured and/or generated during a first time period in an area are potentially manipulated, actions may be taken to mitigate the effects on a digital map updated based on crowd-sourced data. For example, the digital map may be reverted back to a version of the digital map from before the instances of crowd-sourced data captured and/or generated during the first time period in the area were used to update the map. In another example, the digital map may not be updated based on the instances of crowd-sourced data captured and/or generated during the first time period in the area until after it is determined that the instances of crowd-sourced data are not potentially manipulated. Various embodiments, therefore, provide more accurate digital maps by reducing artifacts and/or errors introduced into the digital map through potentially manipulated crowd-sourced data (e.g., crowd-sourced data where the location estimates are potentially manipulated through large-area GNSS spoofing and/or jamming).

Therefore, various embodiments provide improvements to the technical fields of digital map generation and updating using crowd-sourced data.

II. Example System Architecture

FIG. 1 provides an illustration of an example system that can be used in conjunction with various embodiments of the present invention. As shown in FIG. 1, the system includes one or more network apparatuses 10, one or more mobile apparatuses 20, one or more GNSS satellites 30, one or more networks 60, and/or the like. In an example embodiment, the system includes one or more radio nodes or access points 40. In an example embodiment, the network apparatus 10 is a server, group of servers, distributed computing system, part of a cloud-based computing system, and/or other computing system. In various embodiments, a mobile apparatus 20 is a smart phone, tablet, laptop, personal digital assistant (PDA), mobile computing device, navigation system, vehicle control system (e.g., ADAS or automated vehicle control system), mobile data gathering platform and/or the like. For example, in an example embodiment, the mobile apparatus 20 is a vehicle control system configured to autonomously drive a vehicle, assist in control of a vehicle, monitor various aspects of the vehicle (e.g., fault conditions, motor oil status, battery charge level, fuel tank fill level, and/or the like) and/or the like. In various embodiments, the mobile apparatus 20 is configured to autonomously drive a vehicle and may perform multiple functions that are similar to those performed by a mobile apparatus 20 configured to be an automated driver assistance system (ADAS) (e.g., lane keeping, lane change assistance, maintaining a lane, merging, etc.). In an example embodiment, a mobile apparatus 20 is configured to perform one or more positioning and/or navigation-related functions.

In various embodiments, the system further includes a plurality of GNSS satellites 30. For example, GNSS satellites 30 are configured to provide signals that may be used by mobile apparatuses 20 and/or other devices containing a GNSS sensor/receiver to determine position estimates based on signals received by the mobile apparatus 20 or device that were generated by GNSS satellites 30. In various embodiments, devices configured to spoof or jam GNSS signals are located and/or operating within an area within which one or more mobile apparatuses 20 are located and generating instances of crowd-sourced data.

In various embodiments, the system further includes one or more radio nodes and/or access points 40. In various embodiments, the access points 40 are wireless network access points and/or gateways such as Wi-Fi network access points, cellular network access points, Bluetooth access points, and/or other radio frequency-based network access points. For example, in various embodiments, the mobile apparatuses 20 capture sensor data corresponding to observations of features within the mobile apparatuses' 20 environment. In various embodiments, the features may be visible features (e.g., signs, street lights, building facades, road markings, crosswalks, structures such as overpasses or bridges, and/or the like). In various embodiments, the features may be observable via a radio interface. For example, the radio nodes and/or access points 40 may be features observed by the mobile apparatuses 20 via radio interfaces thereof.

In various embodiments, the network apparatus 10 communicates with one or more mobile apparatuses 20 via one or more wired or wireless networks 60. In various embodiments, an access point 40 is a wireless access point that may be used by a mobile apparatus 20 to communicate with network 60. In various embodiments, an access point 40 need not be an access point for accessing network 60.

In an example embodiment, a network apparatus 10 may comprise components similar to those shown in the example network apparatus 10 diagrammed in FIG. 2A. In an example embodiment, the network apparatus 10 is configured to obtain a plurality of instances of crowd-sourced data; determine respective corroboration scores for the instances of crowd-sourced data based on existing map data of a digital map; determine a representative corroboration score for a time period and an area; determine whether instances of crowd-sourced data corresponding to a time period and an area are potentially manipulated based on comparison of the representative corroboration score for the time period and the area to previous representative corroboration scores for the area in previous time periods; perform one or more mitigation actions when it is determined that the instances of crowd-sourced data for the time period in the area are potentially manipulated; update, store, and provide a digital map (e.g., a visual feature map, radio map, and/or the like) for at least the area such that the digital map can be used to perform positioning and/or navigation-related functions; and/or the like.

For example, as shown in FIG. 2A, the network apparatus 10 may comprise a processor 12, memory 14, a user interface 18, a communication interface 16, and/or other components configured to perform various operations, procedures, functions, or the like described herein. In various embodiments, the network apparatus 10 stores a geographical database, digital map, and/or positioning map, such as a radio map (e.g., a radio environment and/or cellular network access point positioning map and/or an access point registry), a visual feature map, or other feature map; computer program code and/or instructions for performing various functions described herein; and/or the like (e.g., in memory 14), for example. In at least some example embodiments, the memory 14 is non-transitory.

In an example embodiment, the mobile apparatus 20 is configured to generate and provide instances of crowd-sourced data; use a feature map (e.g., radio map, visual feature map, and/or the like) to perform one or more positioning and/or navigation functions, and/or the like. Some non-limiting examples of positioning and/or navigation-related functions include providing a route or information corresponding to a geographic area (e.g., via a user interface), localization, localization visualization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

In an example embodiment, the mobile apparatus 20 is a mobile computing device such as a smartphone, tablet, laptop, PDA, navigation system, vehicle control system, an Internet of things (IoT) device, and/or the like. In an example embodiment, as shown in FIG. 2B, the mobile apparatus 20 may comprise a processor 22, memory 24, a communication interface 26, a user interface 28, one or more sensors 29 and/or other components configured to perform various operations, procedures, functions or the like described herein. In various embodiments, the mobile apparatus 20 stores at least a portion of one or more digital maps (e.g., geographic databases, positioning maps, and/or the like) and/or computer executable instructions for generating and/or providing instances of crowd-sourced data, and/or the like in memory 24. In at least some example embodiments, the memory 24 is non-transitory.

In various embodiments, the sensors 29 comprise one or more IMU sensors, one or more GNSS sensors, one or more radio sensors, and/or other sensors. In an example embodiment, the one or more IMU sensors comprise one or more accelerometers, gyroscopes, magnetometers, and/or the like. In various embodiments, the one or more GNSS sensor(s) are configured to communicate with one or more GNSS satellites 30 and determine GNSS-based position estimates and/or other information based on the communication with the GNSS satellites. In various embodiments, the one or more radio sensors comprise one or more radio interfaces configured to observe and/or receive signals generated and/or transmitted by one or more access points and/or other computing entities (e.g., radio nodes and/or access points 40). For example, the one or more interfaces may be configured (possibly in coordination with processor 22) to determine a locally unique identifier, globally unique identifier, and/or operational parameters of a radio node and/or access point 40 observed by the radio sensor(s) (e.g., observed signal strength, round-trip time, timing advance, and/or the like). As used herein, a radio sensor observes an access point 40 by receiving, capturing, measuring and/or observing a (radio frequency) signal generated and/or transmitted by the access point 40. In an example embodiment, the interface of a radio sensor may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface of a radio sensor may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface(s) of the radio senor(s) may be configured to observe radio, millimeter, microwave, and/or infrared wavelength signals. In an example embodiment, the interface of radio sensor may be coupled to and/or part of a communication interface 26. In various embodiments, the sensors 29 may further comprise one or more image sensors configured to capture visual samples, such as digital camera(s), 3D cameras, 360° cameras, and/or image sensors. In various embodiments, the one or more sensors 29 may comprise various other sensors such as two dimensional (2D) and/or three dimensional (3D) light detection and ranging (LiDAR) (s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 60 including, for example, a wired or wireless Personal Area Network (PAN), Local Area Network (LAN), Metropolitan Area Network (MAN), Wide Area Network (WAN), cellular network, and/or the like. In an example embodiment, a network 60 comprises the automotive cloud, digital transportation infrastructure (DTI), radio data system (RDS)/high definition (HD) radio or other digital radio system, and/or the like. For example, a mobile apparatus 20 may be in communication with a network apparatus 10 via the network 60. For example, a mobile apparatus 20 may communicate with the network apparatus 10 via a network, such as the Cloud. For example, the Cloud may be a computer network that provides shared computer processing resources and data to computers and other devices connected thereto. For example, the mobile apparatus 20 generates an instance of crowd-sourced data and provides (e.g., transmits) the instance of crowd-sourced data such that the network apparatus 10 receives the instance of crowd-sourced data via the network 60.

Certain example embodiments of the network apparatus 10 and mobile apparatus 20 are described in more detail below with respect to FIGS. 2A and 2B.

III. Example Operation(s)

FIG. 3 provides a conceptual diagram illustrating various concepts relating to various embodiments. FIG. 3 illustrates a portion of a digital map that provides a representation of an area 300. In various embodiments, the area 300 is a geographical or geopolitical area. For example, the area 300 may be a neighborhood, town, village, zip code, city, county, state, or other geographical or geopolitical region or area. While located at true location 320, a mobile apparatus 20 observes (e.g., captures sensor data pertaining to) observable features 310 (e.g., 310A, 310B, and 310C).

The mobile apparatus 20 generates an instance of crowd-sourced data that includes observation data comprising or determined based on the captured sensor data that pertains to the observable features 310. In a first scenario, the instance of crowd-sourced data includes a location estimate that corresponds to the true location 320 and first characteristics of the observable features are extracted/ascertained from or determined based on the observation data and the true location 320. In a second scenario, large-area GNSS spoofing and/or jamming is being performed in the area 300 and the instance of crowd-sourced data includes a location estimate that corresponds to the spoofed location 330. In the second scenario, second characteristics of the observable features are the instance of crowd-sourced are extracted/ascertained from or determined based on the observation data and the spoofed location 330. The first characteristics are more accurate than the second characteristics and updating a digital map based on the second characteristics will introduce errors and/or inaccuracies into the digital map.

For example, if the observable features 310 are radio nodes and/or access points 40, the extracted/ascertained and/or determined characteristics of the features may include one or more of observed signal strength, round-trip time, timing advance, and/or the like. However, these characteristics of the of the observable features 310 are expected to be different at the true location 320 and the spoofed location 330. Thus, a location, transmitted signal strength of the radio node and/or access point 40 embodying the observable feature 310A will be incorrectly determined and/or estimated in the second scenario where the instance of crowd-sourced data includes a location estimate corresponding to the spoofed location 330. Various embodiments are configured to prevent and/or mitigate the effects of such instances of crowd-sourced data that are affected by large-area GNSS spoofing and/or jamming from negatively affecting the accuracy of a digital map that is updated based on instanced of crowd-sourced data.

For example, in various embodiments, respective corroboration scores are determined for each instance of crowd-sourced data generated during a time period within the area, such that a distribution of respective corroboration scores corresponding to the time period and the area is determined. For example, the respective corroboration score determined for an instance of crowd-sourced data is an indication of the corroboration and/or agreement between at least a portion of the instance of crowd-sourced data and the map data of the digital map. Based on the distribution of the respective corroboration scores corresponding to the time period and the area, a representative corroboration score corresponding to the time period and the area is determined. The representative corroboration score corresponding to the time period and the area is compared to one or more representative corroboration scores corresponding to respective previous time periods and the area. When a result of the comparison indicates substantially reduced or degraded corroboration, it is determined that the location estimates of the instances of crowd-sourced data generated during the time period within the area are potentially manipulated (e.g., via large-area GNSS spoofing and/or jamming). Mitigating action may then be taken to prevent the potentially manipulated instances of crowd-sourced data generated during the time period within the area from negatively affecting the digital map and/or reverting the effect of updating the digital map based on the potentially manipulated instances of crowd-sourced data generated during the time period within the area.

Exemplary Operation of a Mobile Apparatus

In various embodiments, one or more mobile apparatuses 20 may move or travel around one or more areas. For example, a user may carry a mobile apparatus 20 while walking, biking, and/or the like. In another example, the mobile apparatus 20 may be onboard a vehicle as the vehicle traverses at least a portion of a traversable network (e.g., a road network). As the mobile apparatuses 20 move or travel around the one or more areas, the mobile apparatuses 20 observe various observable features (e.g., visible features, radio nodes and/or access points 40, and/or the like) and capture and/or generate respective sensor data pertaining to the observable features observed by the respective mobile apparatuses 20. The mobile apparatuses 20 are further configured to determine and/or cause determination of a location estimate of the mobile apparatus 20. For example, the mobile apparatus 20 may determine a GNSS-based location estimate for the location of the mobile apparatus 20. In another example, the mobile apparatus 20 may cause a Cloud-based positioning service to determine a GNSS-based location estimate for the location of the mobile apparatus 20.

The mobile apparatuses 20 may generate instances of crowd-sourced data that each include a respective location estimate and observation data corresponding to observable features observed by the respective mobile apparatus 20 while located at a location indicated by the respective location estimate. In various embodiments, the observation data is sensor data pertaining to one or more observable features observed by the mobile apparatus 20. In various embodiments, the observation data is information determined based on the sensor data pertaining to one or more observable features observed by the mobile apparatus 20.

For example, the observation data and location estimate are bundled, combined, compressed, formatted, and/or the like into an instance of crowd-sourced data. The mobile apparatuses 20 may then provide (e.g., transmit) the respective instances of crowd-sourced data such that the network apparatus 10 receives the respective instances of crowd-sourced data.

In various embodiments, the mobile apparatuses 20 generate and provide the instances of crowd-sourced data periodically and/or regularly (e.g., once per second, once per minute, once per five minutes, once per ten minutes, once per twenty minutes, once per thirty minutes, once per hour, and/or the like). In an example embodiment, the periodicity with which the mobile apparatus 20 generates and provides instances of crowd-sourced data is determined based on a speed of travel of the mobile apparatus, location of the mobile apparatus (e.g., which area the mobile apparatus 20 is located within), and/or the like. In an example embodiment, the mobile apparatus 20 generates and provides instances of crowd-sourced data in a triggered manner. For example, the mobile apparatus 20 may operate a program or application that triggers the generation and/or provision of an instance of crowd-sourced data when it is determined that the mobile apparatus 20 is located within a threshold distance of one or more specified positions, points of interest, and/or the like.

FIG. 4 provides a flowchart illustrating various processes, procedures, operations, and/or the like for providing an instance of access point observation information. Starting at block 402, a mobile apparatus 20 captures and/or generates observation data. For example, a mobile apparatus 20 comprises means, such as processor 22, memory 24, sensors 29, and/or the like, for capturing and/or generating sensor data and generating observation data based thereon. For example, the sensors 29 (e.g., radio sensors, image sensors, and/or other sensors) of the mobile apparatus 20 may observe, capture, detect, measure, and/or the like sensor data pertaining to one or more observable features. In an example embodiment, the one or more observable features include at least one radio node and/or access point 40 which is observed by the radio interface of the sensors 29 observing, capturing, detecting, measuring, and/or the like a radio frequency signal generated, broadcasted, transmitted, and/or the like by at least one radio node and/or access point 40.

Based on the sensor data captured pertaining to the one or more observable features, the mobile apparatus 20 observation data. In various embodiments, the observation data includes senor data pertaining to the one or more observable features and/or data determined based on and/or ascertained from the sensor data pertaining to the one or more observable features.

For example, in an example embodiment where the observable feature is a radio node and/or access point 40, the mobile apparatus 20 determines one or more characteristics of the radio node and/or access point 40 based on the sensor data pertaining to observation of the radio node and/or access point 40. For example, the one or more characteristics determined by the mobile apparatus 20 may include an access point identifier identifying the radio node and/or access point that generated, broadcasted, transmitted, and/or the like the observed radio frequency signal; a (received) signal strength indicator configured to indicate a strength of the observed, captured, detected, measured, and/or the like radio signal; a time parameter configured to indicate a one-way or round trip time for communicating with the access point 40; a channel and/or frequency of transmission used by the access point 40; and/or the like characterizing the observation of the radio node and/or access point 40 by the mobile apparatus 20. The mobile apparatus 20 generates observation data comprising one or more of the determined characteristics of the radio node and/or access point and/or sensor data pertaining to the observation of the radio node and/or access point 40. For example, in an example embodiment, the observation data includes the access point identifier. The mobile apparatus 20 generates the observation data, in an example embodiment, such that the observation data further comprises the (received) signal strength indicator, the time parameter, and/or other information characterizing the observation of the radio node and/or access point 40 by the mobile apparatus 20.

At block 404, the mobile apparatus 20 determines a location estimate. For example, the mobile apparatus 20 comprises means, such as processor 22, memory 24, sensors 29, and/or the like, for determining a location estimate. In an example embodiment, the location estimate provides an indication of the location of the mobile apparatus 20 when the mobile apparatus 20 observed the one or more observable features to which the observation data pertains. For example, the location estimate comprises an estimate of the position of the mobile apparatus 20 (e.g., in the form of a latitude and longitude pair, and/or the like) when the mobile apparatus 20 captured the sensor data based on which observation data was determined. In an example embodiment, the location estimate is generated using GNSS-based positioning techniques.

At block 406, the mobile apparatus 20 bundles, combines, compresses, formats, and/or the like the observation data and the corresponding observation data into an instance of crowd-sourced data and provides (e.g., transmits) the instance of crowd-sourced data. For example, the mobile apparatus 20 comprises means, such as processor 22, memory 24, communication interface 26, and/or the like, for bundling, combining, compressing, formatting, and/or the like the observation data and the location estimate into an instance of crow-sourced data and providing the (e.g., transmitting) the instance of crowd-sourced data. For example, the mobile apparatus 20 may provide the instance of crowd-sourced data via one or more wired and/or wireless networks 60 such that the network apparatus 10 receives the instance of crowd-sourced data.

Exemplary Operation of a Network Apparatus

The network apparatus 10 receives a plurality of instances of crowd-sourced data generated and provided by one or more respective mobile apparatuses 20. The network apparatus 10 process the plurality of instances crowd-sourced data to assign and/or associate each instance of crowd-sourced data of the plurality of instances of crowd-sourced data to a respective time period and area bin and/or group. For example, the network apparatus 10 stores (e.g., in memory 14) information identifying one or more defined areas. For example, each instance of crowd-sourced data assigned to a particular bin and/or group was captured by a respective mobile apparatus 20 during a particular time period while the respective mobile apparatus 20 was located within a particular area.

In various embodiments, each of the one or more defined areas is a respective geographical or geopolitical area. For example, an area may be a neighborhood, town, village, zip code, city, county, state, or other geographical or geopolitical region or area. In various embodiments, a time period is a defined time window. For example, a time period may be defined and/or designated time window of five minutes, ten minutes, fifteen minutes, twenty minutes half an hour, one hour, two hours, six hours, twelve hours, twenty-four hours, and/or the like.

The network apparatus 10 processes the instances of crowd-sourced data of each bin and/or group. For example, network apparatus 10 determines a respective corroboration score for each instance of crowd-sourced data of a respective bin and/or group. In various embodiments, the respective corroboration score indicates the corroboration and/or agreement between at least a portion of the respective instance of crowd-sourced data and the map data of a digital map.

For example, in an example embodiment, the location estimate is extracted from the respective instance of crowd-sourced data as a first location estimate. A second location estimate is determined based on the observation data of the respective instance of crowd-sourced data and the digital map. For example, when the observation data includes information pertaining to observation of one or more radio nodes and/or access points 40 and the digital map is a radio map, a radio-based location estimate may be determined as the second location estimate. In another example, when the observation data includes information pertaining to observation of one or more visible features and the digital map is a visible feature map, a visual odometry-based location estimate may be determined as the second location estimate. A cross-correlation, cross-validation, and/or distance between the first location estimate and the second location estimate may be determined. The respective corroboration score for the instance of crowd-sourced data is determined based on the cross-correlation, cross-validation, and/or distance between the first location estimate and the second location estimate.

In another example, in an example embodiment, the respective corroboration score for the respective instance of crowd-sourced data is determined based on a cross-validation between at least a portion of the observation data of the respective instance of crowd-sourced data corresponding to a particular observable feature and the map data of the digital map corresponding to the particular observable feature. For example, the observation data and the first location estimate extracted from the respective instance of crowd-sourced data are used to determine one or more first characteristics of one or more observable features. Corresponding second characteristics of the one or more observable features are extracted from the digital map. The one or more first characteristics and one or more second characteristics are compared and/or analyzed to determined that probability that the one or more first characteristics and the one or more second characteristics are in agreement. For example, in an example embodiment, the digital map is a radio map indicating the location of a radio node and/or access point 40 identified in the observation data. The network apparatus 10 may determine whether the first location estimate extracted from the respective instance of crowd-sourced data is located within the coverage area of the radio node and/or access point 40 identified in the observation data. For example, the network apparatus 10 may determine whether it is expected that the radio node and/or access point 40 identified in the observation data would be observable at the first location estimate and/or be observable at the first location estimate with the observed (received) signal strength, timing parameter, and/or the like. The respective corroboration score for the respective instance of crowd-sourced data is determined based on how likely the first characteristics and the second characteristics agree, are drawn from the same distribution, and/or the like.

The distribution of respective corroboration scores for the instances of crowd-sourced data of a bin and/or group is processed to determine a representative corroboration score for the bin and/or group. For example, the representative corroboration score may be determined based at least in part on the average respective corroboration score (e.g., mean, mode, or median), the corroboration score corresponding to a particular percentile of the respective corroboration scores (e.g., $25^{th}$ percentile, $75^{th}$ percentile, and/or the like), a maximum or minimum of the distribution of respective corroboration scores, and/or the like.

The representative corroboration score corresponding to a time period and an area is compared to one or more representative corroboration scores corresponding to respective previous time periods and the area. When a result of the comparison indicates substantially reduced or degraded corroboration between the instances of crowd-sourced data and the digital map, it is determined that the location estimates of the instances of crowd-sourced data generated during the time period within the area are potentially manipulated (e.g., via large-area GNSS spoofing and/or jamming). The network apparatus 10 then takes mitigating action to prevent the potentially manipulated instances of crowd-sourced data generated during the time period within the area from negatively affecting the digital map and/or reverting the effect of updating the digital map based on the potentially manipulated instances of crowd-sourced data generated during the time period within the area. In an example embodiment, the network apparatus 10 may generate and provide (e.g., transmit) one or more notifications of the potential manipulation of location estimates within the area during the time period to the authorities (e.g., a government body or agency), a public media outlet, and/or the like. For example, the notification may be provided to an authority computing entity (e.g., a computing entity operated by and/or on behalf of a government body or agency), a media computing entity (e.g., a computing entity operated by and/or on behalf of a public media outlet), and/or the like.

In various embodiments, instances of crowd-sourced data that are expected to be outliers and or are likely to have poor agreement with the map data of the digital map for reasons other than large-area GNSS spoofing and/or jamming may include a flag or other indication in the respective instance of crowd-sourced data that the respective instance of crowd-sourced data should not be considered when determining that whether large-area GNSS spoofing and/or jamming may have potentially manipulated the instances of crowd-soured data during a corresponding time period. For example, responsive to determining that a respective instance of crowd-sourced data comprises an indication of an expected potentially poor corroboration between the respective instance of crowd-sourced data and the map data, the network apparatus 10 excludes the respective instance of crowd-sourced data from a determination of the first representative corroboration score.

In another example, the network apparatus 10 may store information regarding one or more areas for which an analysis of potential manipulation may yield a false positive result. For example, it may be known a priori that a radio node and/or access point 40 infrastructure within a particular area was substantially changed recently. Therefore, instances of crowd-sourced data captured within the particular area may appear to be potentially manipulated; however, it is known that the lack of agreement and/or corroboration between the instances of crowd-sourced data captured in the particular area and the existing map data is likely not due to large-area GNSS spoofing and/or jamming.

FIG. 5 provides a flowchart illustrating various processes, procedures, operations, and/or the like, performed by a network apparatus 10, in various embodiments, to mitigate the effects of large-area GNSS spoofing and/or jamming from affecting a digital map that is updated using crowd-sourced data, according to an example embodiment.

Starting at block 502, a network apparatus 10 obtains a plurality of instances of crowd-sourced data. For example, the network apparatus 10 comprises means, such as processor 12, memory 14, communication interface 16, user interface 18, and/or the like, for obtaining a plurality of instances of crowd-sourced data. For example, the network apparatus 10 may receive (e.g., via communication interface 16 and/or user interface 18) a plurality of instances of crowd-sourced data, each instance generated by a respective one of one or more mobile apparatuses 20. The network apparatus 10 may directly and/or immediately process the plurality of instances of crowd-sourced data upon receipt thereof (e.g., provide them directly to processor 12 for processing) or may store the plurality of instances of crowd-sourced data (e.g., in memory 14) for accessing and/or retrieving later for processing.

Each instance of crowd-sourced data comprises a respective a first location estimate and observation data. The first location estimate indicates the location of the respective mobile apparatus 20 when the respective mobile apparatus 20 captured sensor data used to determine the observation data. In various embodiments, the first location estimate is a GNSS-based location estimate. In various embodiments, the first location estimate provides a latitude and longitude pair; latitude, longitude, and elevation; a heading and/or orientation of the respective mobile apparatus 20; and/or the like.

The observation data corresponds to (e.g., includes and/or was determined based on) sensor data captured by one or more sensors 29 of the respective mobile apparatus 20 and pertaining to one or more observable features in the environment of the respective mobile apparatus 20. For example, the observable features may be radio nodes and/or access points, visible features (e.g., signs, street lights, building facades, road markings, crosswalks, structures such as overpasses or bridges, and/or the like), and/or the like. In an example embodiment, the observation data pertains to one or more observed radio nodes and/or access points 40. For example, the observation data one or more radio node and/or access point identifiers, in various embodiments. Each radio node and/or access point identifier is configured to identify a radio node and/or access point that was observed by the respective mobile apparatus 20. In an example embodiment, the observation data further comprises information characterizing the respective observations of the one or more radio nodes and/or access points 40 by the respective mobile apparatus 20. For example, in an example embodiment, the observation data comprises a (received) signal strength indicator, a time parameter, and/or the like, each associated with a respective one of the one or more radio node and/or access point identifiers.

In various embodiments, the plurality of instances of crowd-sourced data are binned and/or grouped by the respective area within which the instance of crowd-sourced data was generated (e.g., as determined based on the respective first location estimate included in the instance of crowd-source data) and the time period during which the instance of crowd-sourced data was generated. In an example embodiment, an instance of crowd-sourced data includes a time stamp indicating the time at which the instance of crowd-sourced data was generated and the time stamp is used to determine which time period the instance of crowd-sourced data was generated during. In another example embodiment, the mobile apparatuses 20 are configured to provide (e.g., transmit) an instance of crowd-sourced data as soon as the instance of crowd-sourced data is generated such that the time of receipt of the instance of crowd-sourced data by the network apparatus 10 may be used to determine during which time period the instance of crowd-source data was generated.

At block 504, for each instance of crowd-sourced data within a particular bin or group (e.g., corresponding to a particular area and a first time period), the network apparatus 10 determines a respective corroboration score. For example, the network apparatus 10 comprises means, such as processor 12, memory 14, and/or the like, for determining a respective corroboration score for each instance of crowd-sourced data within a particular bin or group (e.g., corresponding to a particular area and the first time period). In various embodiments, a respective corroboration score indicates a degree and/or amount of corroboration and/or agreement between the respective instance of crowd-sourced data and map data of a digital map stored by the network apparatus 10 (e.g., in memory 14).

In various embodiments, the respective corroboration score for the respective instance of crowd-sourced data is determined, at least in part, based on a cross-validation between the respective first location estimate extracted from the respective instance of crowd-sourced data and a second location estimate determined at least in part based on the map data of the digital map and the observation data extracted from the respective instance of crowd-sourced data. For example, in an example embodiment, to determine the respective corroboration score, the network apparatus 10 extracts the first location estimate from the respective instance of crowd-sourced data. The network apparatus 10 extracts the observation data from the respective instance of crowd-sourced data. Based on the observation data and the map data of the digital map, the network apparatus 10 determines a second location estimate. For example, in an example embodiment, the digital map is a radio map configured to enable radio-based positioning within the area and the observation data includes information pertaining to observation of one or more radio nodes and/or access points 40 and the digital map is a radio map. The network apparatus 10 uses a radio-based positioning technique to determine a second location estimate using the observation data (e.g., information pertaining to observation of one or more radio nodes and/or access points 40 by the respective mobile apparatus 20) and map data of the radio map (e.g., coverage area models, radio node and/or access point locations, radio node and/or access point transmitted signal strength, and/or the like) to determine a second location estimate. a radio-based location estimate may be determined as the second location estimate. The network apparatus 10 determines a cross-correlation, cross-validation, and/or distance between the first location estimate and the second location estimate. The respective corroboration score for the respective instance of crowd-sourced data is determined based on the cross-correlation, cross-validation, and/or distance between the first location estimate and the second location estimate. For example, in an example embodiment, the respective corroboration score for the respective instance of crowd-sourced data is a function of the distance between the first location estimate and the second location estimate (e.g., the respective corroboration score is equal to the distance, equal to the distance squared, equal to a ratio of the distance to a length scale of the area, and/or the like). For example, if the first location estimate and the second location estimate are within three meters of one another, the network apparatus 10 would find a higher level of agreement or corroboration between the instance of crowd-sourced data and the digital map than if the first location estimate and the second location estimate were separated by twenty meters or more.

In another example, in an example embodiment, the respective corroboration score for the respective instance of crowd-sourced data is determined based on a cross-validation between at least a portion of the observation data of the respective instance of crowd-sourced data corresponding to a particular observable feature and the map data of the digital map corresponding to the particular observable feature. For example, to determine the respective corroboration score for a respective instance of crowd-sourced data, the network apparatus 10 extracts the observation data and the first location estimate from the respective instance of crowd-sourced data. The network apparatus 10 uses the observation data and, possibly, first location estimate to determine one or more first characteristics of one or more observable features. The network apparatus 10 determines corresponding second characteristics of the one or more observable features based on map data of the digital map. In an example embodiment, the network apparatus determines the first characteristics based on the observation data and the first location estimate and determines the second characteristics based on the map data of the digital map. In an example embodiment, the network apparatus 10 determines the first characteristics based on the observation data and determines the second characteristics based on the first location estimate and the map data of the digital map. The network apparatus 10 compares and/or analyzes the one or more first characteristics and one or more second characteristics to determine the probability that the one or more first characteristics and the one or more second characteristics are in agreement (or disagreement). For example, in an example embodiment, the digital map is a radio map indicating the location of a radio node and/or access point 40 identified in the observation data. The network apparatus 10 may determine whether the first location estimate extracted from the respective instance of crowd-sourced data is located within the coverage area of the radio node and/or access point 40 identified in the observation data. For example, the network apparatus 10 may determine whether it is expected that the radio node and/or access point 40 identified in the observation data would be observable at the first location estimate and/or be observable at the first location estimate with the observed (received) signal strength, timing parameter, and/or the like based on the map data of the digital map. In another example, the network apparatus 10 may determine the probability that a mobile apparatus 20 located at the first location estimate would observe a particular radio node and/or access point with the (received) signal strength reported in the observation data. The respective corroboration score for the respective instance of crowd-sourced data is determined based on how likely the first characteristics and the second characteristics agree, are drawn from the same distribution, and/or the like.

At block 506, the network apparatus 10 determines a representative corroboration score for the bin and/or group corresponding to the area and the first time period. For example, the network apparatus 10 comprises means, such as processor 12, memory 14, and/or the like, for determining a representative corroboration score corresponding to the area and the first time period. For example, the network apparatus 10 determines a representative corroboration score corresponding to the area and the first time period by processing the distribution of respective corroboration scores for the instances of crowd-sourced data corresponding to the area and the first time period. For example, the representative corroboration score may be determined based at least in part on the average respective corroboration score (e.g., mean, mode, or median), the corroboration score corresponding to a particular percentile of the respective corroboration scores (e.g., $25^{th}$ percentile, $75^{th}$ percentile, and/or the like), a maximum or minimum of the distribution of respective corroboration scores, and/or the like.

At block 508, the network apparatus 10 compares the representative corroboration score corresponding to the area and the first time period to one or more representative corroboration scores corresponding to the area and one or more previous time periods (e.g., time periods that occurred prior to the occurrence of the first time period). For example, the network apparatus 10 comprises means, such as processor 12, memory 14, and/or the like, for comparing the representative corroboration score corresponding to the area and the first time period to one or more representative corroboration scores corresponding to the area and one or more previous time periods (e.g., time periods that occurred prior to the occurrence of the first time period). For example, the network apparatus 10 stores (e.g., in memory 14) at least one representative corroboration score corresponding to the area and a second time period. The second time period is different from the first time period. In various embodiments, the first time period and the second time period do not overlap. In an example embodiment, the second time period occurred before the occurrence of the first time period (e.g., the second time period is a previous time period with respect to the first time period). In an example embodiment, the network apparatus 10 stores (e.g., in memory 14) a plurality of representative corroboration scores corresponding to the area and respective second time periods.

As used herein, the term the first representative corroboration score refers to the representative corroboration score corresponding to the area and the first time period and the term the second representative corroboration score refers to a representative corroboration score corresponding to the area and a respective second time period. In various embodiments, the network apparatus 10 determines whether the first representative corroboration score indicates a statistically significant and/or substantial reduction or degradation in the agreement and/or corroboration between the digital map and instances of crowd-sourced data corresponding to the first time period (and the area) and between the digital map and instances of crowd-sourced data corresponding to the second time period (and the area).

In various embodiments, the network apparatus 10 compares the first representative corroboration score and the at least one second representative corroboration score to determine whether the corroboration and/or agreement of the digital map and instances of crowd-sourced data captured during the first time period (in the area) is different from the corroboration and/or agreement of the digital map and instances of crowd-sourced data captured during a respective second time period (in the area). For example, the network apparatus 10 compares the first representative corroboration score and the at least one second representative corroboration score to determine whether the first representative corroboration score indicates a substantial reduction or degradation in the corroboration and/or agreement of the digital map and instances of crowd-sourced data captured during the first time period (in the area) compared to previous time periods (in the area).

In an example embodiment, the network apparatus 10 stores a plurality of second representative corroboration scores for the area and/or a distribution of second representative corroboration scores for the area (e.g., in memory 14). For example, in an example embodiment where the distribution of the second representative corroboration scores is estimated as and/or represented by a normal or Gaussian distribution, the network apparatus 10 may store or determine an average and a standard deviation of the representative corroboration scores for the area. The network apparatus 10 may compare the first representative corroboration score to the plurality of second representative corroboration scores by determining a standard deviation corresponding to the first representative corroboration score with respect to the distribution of second representative corroboration scores.

In an example embodiment, the network apparatus 10 may compare representative corroboration scores corresponding to the first time period and different areas to identify areas that during the first time period have substantially less and/or statistically significant poorer agreement between the digital map and the instances of crowd-sourced data.

At block 510, the network apparatus 10 determines whether the instances of crowd-sourced data corresponding to the first time period and the area are potentially manipulated (e.g., potentially affected by large-area GNSS spoofing and/or jamming). For example, the network apparatus 10 comprises means, such as processor 12, memory 14, and/or the like, for determining whether the instances of crowd-sourced data corresponding to the first time period and the area are potentially manipulated (e.g., potentially affected by large-area GNSS spoofing and/or jamming). In various embodiments, in response to determining that the first representative corroboration score indicates a substantial and/or statistically significant reduction or degradation in the corroboration and/or agreement of the digital map and instances of crowd-sourced data captured during the first time period (in the area) compared to previous time periods (in the area), the network apparatus 10 determines that the instances of crowd-sourced data corresponding to the first time period and the area are potentially manipulated (e.g., potentially affected by large-area GNSS spoofing and/or jamming). In various embodiments, in response to determining that the first representative corroboration score do not indicate a substantial and/or statistically significant reduction or degradation in the corroboration and/or agreement of the digital map and instances of crowd-sourced data captured during the first time period (in the area) compared to previous time periods (in the area), the network apparatus 10 determines that the instances of crowd-sourced data corresponding to the first time period and the area are not potentially manipulated (e.g., likely not potentially affected by large-area GNSS spoofing and/or jamming). For example, in response to determining that the first representative corroboration score indicates that the corroboration and/or agreement of the digital map and instances of crowd-sourced data captured during the first time period (in the area) are substantially the same as (e.g., not statistically different from) or indicate better corroboration and/or agreement compared to previous time periods (in the area), the network apparatus 10 determines that the instances of crowd-sourced data corresponding to the first time period and the area are not potentially manipulated (e.g., not affected by large-area GNSS spoofing and/or jamming).

At block 512, in response to determining that the instances of crowd-sourced data corresponding to the first time period and the area are potentially manipulated, the network apparatus 10 performs one or more mitigating actions. For example, the network apparatus 10 comprises means, such as processor 12, memory 14, and/or the like for performing one or more mitigating actions responsive to determining that the instances of crowd-sourced data corresponding to the first time period and the area are potentially manipulated. For example, the network apparatus 10 determines a mitigated version of the map data of the digital map corresponding to the area that mitigates the effects of the potential manipulation (e.g., via large-area GNSS spoofing and/or jamming) of the instances of crowd-sourced data corresponding to the first time period and the area.

In various embodiments, the mitigating actions include preventing the use of the one or more instances of crowd-sourced data corresponding to the first time period and the area from being used to update the map data of the digital map. For example, in an example embodiment, the instances of crowd-sourced data corresponding to the first time period and the area are not used to update the map data of the digital map until after it is determined that the instances of crowd-sourced data corresponding to the first time period and the area are not potentially manipulated. For example, the mitigated version of the map data corresponding to the area may be determined to be the version of the map data corresponding to the area that is not updated based on the instances of crowd-sourced data corresponding to the first time period and the area.

In various embodiments, the mitigating actions include reverting an effect of using the one or more instances of crowd-source data to update the map data. For example, in various embodiments, the a previous version of the digital map (e.g., a pre-first time period version) is stored until after it is determined whether the instances of crowd-sourced data corresponding to the first time period and the area are potentially manipulated. For example, the mitigated version of the map data corresponding to the area may be determined to be the previous version of the map data corresponding to the area. In another example, the instances of crowd-sourced data corresponding to the first time period and the area are stored and the mitigating actions include updating the map data of the digital map (that has already been updated based on the instances of crowd-sourced data corresponding to the first time period and the area) to remove the effect of the instances of crowd-sourced data corresponding to the first time period and the area from the map data. For example, the mitigated version of the map data corresponding to the area may be determined to be the version of the map data corresponding to the area that is updated to remove the updates that were performed based on the instances of crowd-sourced data corresponding to the first time period and the area.

At block 514, in various embodiments, the network apparatus 10 provides (e.g., displays and/or transmits) a notification of the potential manipulation of the instances of crowd-sourced data corresponding to the first time period and the area. For example, the network apparatus 10 comprises means, such as processor 12, memory 14, communication interface 16, user interface 18, and/or the like, for providing (e.g., displaying and/or transmitting) a notification of the potential manipulation of the instances of crowd-sourced data corresponding to the first time period and the area. For example, the network apparatus 10 may provide a notification that indicates that large-area GNSS spoofing and/or jamming may be occurring and/or may have occurred during the first time period in the area. In an example embodiment, the network apparatus 10 generates and provides (e.g., transmits) one or more notifications of the potential manipulation of location estimates within the area during the time period to the authorities (e.g., a government body or agency), a public media outlet, and/or the like.

In an example embodiment, a determination of whether or not to generate and provide a notification of the potential manipulation is performed based at least in part on reports of spoofing detection in the area reported by mobile apparatuses 20. For example, a mobile apparatus 20 may determine a GNSS-based position estimate for the mobile apparatus 20. The mobile apparatus 20 may also determine one or more other position estimates based on other and/or non-GNSS positioning technologies (e.g., radio-based positioning, IMU-based positioning, hybrid positioning, visual and/or computer vision-based positioning, and/or the like). When a discrepancy between the GNSS-based position estimate and the one or more other position estimates for the mobile apparatus 20 satisfies a discrepancy threshold criteria (e.g., the GNSS-based position estimate is more than a threshold distance from the one or more other position estimates) the mobile apparatus 20 may determine that the mobile apparatus 20 is potentially experiencing GNSS spoofing. The mobile apparatus 20 may generate and transmit a potential spoofing report the potential GNSS spoofing such that the network apparatus 10 receives the potential spoofing report.

The network apparatus 10 may track the number of potential spoofing reports received corresponding to the first time period and the area. The more widespread (e.g., spatially dispersed across the area) and/or numerous the potential spoofing reports corresponding to the first time period and the area, the more likely the network apparatus 10 is provide a notification regarding the detected potential manipulation. For example, in an example embodiment, when the spatial dispersion and/or number of potential spoofing reports corresponding to the first time period and the area satisfy respective and/or combined notifying criteria, the network apparatus 10 determines a notification regarding the potential manipulation of the instances of crowd-sourced data corresponding to the first time period and the area is to be generated and provided. For example, in an example embodiment, when the spatial dispersion and/or number of potential spoofing reports corresponding to the first time period and the area do not satisfy respective and/or combined notifying criteria, the network apparatus 10 determines to not generate and provide a notification regarding the potential manipulation of the instances of crowd-sourced data corresponding to the first time period and the area.

Continuing with FIG. 5, responsive to determining, at block 510, that the instances of crowd-sourced corresponding to the first time period and the area are not potentially manipulated, the process continues to block 516. At block 516, the network apparatus 10 stores the representative corroboration score for the first time period for the area. For example, the network apparatus 10 comprises means, such as processor 12, memory 14, and/or the like, for storing the representative corroboration score for the first time period for the area. For example, the network apparatus 10 may store an array and/or a plurality of representative corroboration scores for the area with each representative corroboration score of the array and/or a plurality of representative corroboration scores corresponding to a different time period. In an example embodiment, the array and/or a plurality of representative corroboration scores stores up to a maximum number of representative corroboration scores for the area in a first in-first out or oldest entry deleted upon addition of a new entry paradigm. In an example embodiment, the network apparatus 10 stores a distribution of representative corroboration scores for the area and/or a representation of the distribution of representative corroboration scores for the area (e.g., an average and standard deviation in a scenario where the distribution of representative corroboration scores is represented by a normal or Gaussian distribution) and the network apparatus 10 updates the distribution of representative corroboration scores and/or the representation of the distribution of representative corroboration scores based on the representative corroboration score corresponding to the first time period and the area.

The network apparatus 10 may then store and provide the updated map data of the digital map corresponding to the area, in the case where the instances of crowd-sourced data corresponding to the first time period and the area are determined to not be potentially manipulated, and/or the mitigated map data of the digital map corresponding to the area, in the case where the instances of crowd-sourced data corresponding to the first time period and the area are determined to be potentially manipulated. For example, the stored map data may be provided and/or used to perform one or more positioning and/or navigation-related functions by and/or for one or more mobile apparatuses 20 and/or other computing entities. Some non-limiting examples of positioning and/or navigation-related functions include providing a route or information corresponding to a geographic area (e.g., via a user interface), localization, localization visualization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

FIGS. 6A, 6B, and 7 provide flowcharts that illustrate some examples of process flows for updating the map data of the digital map for the area and/or determining mitigated map data of the digital map for the area based on whether the instances of crowd-sourced data corresponding to the first time period and the area are determined to be potentially manipulated, according to various embodiments. For example, FIGS. 6A and 6B illustrate examples process flows of respective example embodiments where the mitigating actions include reverting an effect of using the one or more instances of crowd-source data to update the map data. FIG. 7 illustrates an example process flow of an example embodiment where the mitigating actions include preventing the use of the one or more instances of crowd-sourced data from being used to update the map data.

Starting with block 602 of FIG. 6A, the network apparatus 10 stores (e.g., in memory 14) a pre-first time period and/or previous version of the map data of the digital map for the area. For example, the network apparatus 10 comprises means, such as processor 12, memory 14, and/or the like for storing a pre-first time period and/or previous version of the map data of the digital map for the area. For example, the pre-first time period and/or previous version of the map data for the area is the version of the map data for the area that was most recently updated based on instances of crowd-sourced data that were determined to not be potentially manipulated. For example, the pre-first time period and/or previous version of the map data for the area may be the version of the map data from the start of the first time period and/or the end of the time period immediately preceding the first time period.

At block 604, the network apparatus 10 updates the map data for the area based on instances of crowd-sourced data corresponding to the first time period and the area. For example, the network apparatus 10 comprises means, such as processor 12, memory 14, communication interface 16, and/or the like, for updating the map data for the area based on instances of crowd-sourced data corresponding to the first time period and the area.

For example, the network apparatus 10 obtains (e.g., receives and/or accesses) instances of crowd-sourced data corresponding to the first time period and the area and uses one or more map updating techniques to update the map data of the digital map for the area based on the instances of crowd-sourced data corresponding to the first time period and the area. For example, in an example embodiment, the network apparatus 10 receives one or more instances of crowd-sourced data corresponding to the first time period and the area via one or more wired and/or wireless networks 60. Each of the one or more instances of crowd-sourced data corresponding to the first time period and the area was generated and provided by a respective mobile apparatus 20. For example, the network apparatus 10 may receive the one or more instances of crowd-sourced data corresponding to the first time period and the area during the first time period. The network apparatus 10 updates the map data for the area based on an instance of crowd-sourced data corresponding to the first time period and the area in response to and/or immediately upon receiving the instance of crowd-sourced data corresponding to the first time period and the area, in an example embodiment. In another example embodiment, the network apparatus 10 updates the map data for the area based on one or more batches of crowd-sourced data corresponding to the first time period and the area during and/or upon completion of the first time period.

At block 606, the network apparatus determines whether the instances of crowd-sourced data corresponding to the first time period and the area are potentially manipulated. For example, the network apparatus 10 comprises means, such as processor 12, memory 14, and/or the like, for determining whether the instances of crowd-sourced data corresponding to the first time period and the area are potentially manipulated. For example, in various embodiments, the network apparatus 10 performs blocks 504-510 of FIG. 5 to determine whether the instances of crowd-sourced data corresponding to the first time period and the area are potentially manipulated.

Continuing with FIG. 6A, responsive to determining, at block 606, that the instances of crowd-sourced data corresponding to the first time period and the area are potentially manipulated, the process continues to block 608. At block 608, the map data for the area is reverted to the pre-first time period or previous version of the map data for the area. For example, the updated map data for the area may be replaced (e.g., in the digital map and/or a geographical database embodying the digital map) with the pre-first time period and/or previous version of the map data for the area. For example, the effect of the (potentially manipulated) instances of crowd-sourced data corresponding to the first time period and the area on the map data corresponding to the area is mitigated and/or reverted by replacing the updated map data with the pre-first time period and/or previous version of the map data for the area. For example, the network apparatus 10 may determine mitigated map data for the area that is the same as the pre-first time period and/or previous version of the map data for the area.

For example, the network apparatus 10 reverts to the pre-first time period or previous version of the map data for the area. For example, the network apparatus 10 comprises means, such as processor 12, memory 14, and/or the like for reverting to the pre-first time period or previous version of the map data for the area. For example, the network apparatus 10 may determine mitigated map data for the area by reverting back to the pre-first time period and/or previous version of the map data for the area.

At block 610, the network apparatus 10 stores (e.g., in memory 14) and/or provides the mitigated map data for the area. For example, the network apparatus 10 comprises means, such as processor 12, memory 14, communication interface 16, and/or the like for storing and/or providing the mitigated map data for the area. For example, the stored mitigated map data may be provided and/or used to perform one or more positioning and/or navigation-related functions by and/or for one or more mobile apparatuses 20 and/or other computing entities.

Responsive to determining, at block 606, that the instances of crowd-sourced data corresponding to the first time period and the area are not potentially manipulated, the process continues to block 612. At block 612, the network apparatus 10 stores (e.g., in memory 14) and/or provides the updated map data the area (e.g., the map data that was updated based on the instances of crowd-sourced data corresponding to the first time period and the area at block 604). For example, the network apparatus 10 comprises means, such as processor 12, memory 14, communication interface 16, and/or the like for storing and/or providing the updated map data for the area. For example, the stored updated map data may be provided and/or used to perform one or more positioning and/or navigation-related functions by and/or for one or more mobile apparatuses 20 and/or other computing entities.

Continuing to FIG. 6B, at block 652, the network apparatus 10 receives instances of crowd-sourced data corresponding to the first time period and the area and stores (e.g., in memory 14) the instances of crowd-sourced data corresponding to the first time period and the area. For example, the network apparatus 10 comprises means, such as processor 12, memory 14, communication interface 16, and/or the like for receiving instances of crowd-sourced data corresponding to the first time period and the area and storing (e.g., in memory 14) the instances of crowd-sourced data corresponding to the first time period and the area. For example, the network apparatus 10 may generate and/or store a database and/or table corresponding to the first time period and the area and update the database and/or table to include the information provided by the received instances of crowd-sourced data corresponding to the first time period and the area. In various embodiments, the network apparatus 10 stores (e.g., in memory 14) instances of crowd-sourced data corresponding to a particular time period for the area for at least the particular time period. For example, the network apparatus 10 may store instances of crowd-sourced data corresponding to the current time period and two, three, or more previous time periods.

At block 654, the network apparatus 10 updates the map data for the area based on instances of crowd-sourced data corresponding to the first time period and the area. For example, the network apparatus 10 comprises means, such as processor 12, memory 14, communication interface 16, and/or the like, for updating the map data for the area based on instances of crowd-sourced data corresponding to the first time period and the area.

For example, the network apparatus 10 obtains (e.g., receives and/or accesses) instances of crowd-sourced data corresponding to the first time period and the area and uses one or more map updating techniques to update the map data of the digital map for the area based on the instances of crowd-sourced data corresponding to the first time period and the area. For example, in an example embodiment, the network apparatus 10 receives one or more instances of crowd-sourced data corresponding to the first time period and the area via one or more wired and/or wireless networks 60. Each of the one or more instances of crowd-sourced data corresponding to the first time period and the area was generated and provided by a respective mobile apparatus 20. For example, the network apparatus 10 may receive the one or more instances of crowd-sourced data corresponding to the first time period and the area during the first time period. The network apparatus 10 updates the map data for the area based on an instance of crowd-sourced data corresponding to the first time period and the area in response to and/or immediately upon receiving the instance of crowd-sourced data corresponding to the first time period and the area, in an example embodiment. In another example embodiment, the network apparatus 10 updates the map data for the area based on one or more batches of crowd-sourced data corresponding to the first time period and the area during and/or upon completion of the first time period.

At block 656, the network apparatus 10 determines whether the instances of crowd-sourced data corresponding to the first time period and the area are potentially manipulated. For example, the network apparatus 10 comprises means, such as processor 12, memory 14, and/or the like, for determining whether the instances of crowd-sourced data corresponding to the first time period and the area are potentially manipulated. For example, in various embodiments, the network apparatus 10 performs blocks 504-510 of FIG. 5 to determine whether the instances of crowd-sourced data corresponding to the first time period and the area are potentially manipulated.

Continuing with FIG. 6B, responsive to determining, at block 656, that the instances of crowd-sourced data corresponding to the first time period and the area are potentially manipulated, the process continues to block 658. At block 658, the updated map data for the area is reverted by un-updating the updated map based on the stored instances of crowd-sourced data corresponding to the first time period and the area. For example, the network apparatus 10 accesses the stored instances of crowd-sourced data corresponding to the first time period and the area (e.g., from the memory 14) and performs the one or more map updating techniques using the information of the instances of crowd-sourced data as negative measurements. For example, in an example embodiment, the map data for the area includes an average (received) signal strength for a particular radio node and/or access point 40 at a particular location. Any contribution to the average (received) signal strength for the particular radio node and/or access point 40 at the particular location provided by the instances of crowd-sourced data for the first time period and the area are removed to provide a reverted and/or mitigated average (received) signal strength for the particular radio node and/or access point 40 at the particular location.

For example, the network apparatus 10 un-updates the map data for the area based on the stored instances of crowd-sourced data for the first time period and the area. For example, the network apparatus 10 comprises means, such as processor 12, memory 14, and/or the like for un-updating the map data for the area based on the stored instances of crowd-sourced data for the first time period and the area. For example, the network apparatus 10 may determine mitigated map data for the area by removing the effects of the instances of crowd-sourced data corresponding to the instances of crowd-sourced data for the first time period and the area from the updated map data for the area determined at block 654.

At block 660, the network apparatus 10 stores (e.g., in memory 14) and/or provides the mitigated map data for the area. For example, the network apparatus 10 comprises means, such as processor 12, memory 14, communication interface 16, and/or the like for storing and/or providing the mitigated map data for the area. For example, the stored mitigated map data may be provided and/or used to perform one or more positioning and/or navigation-related functions by and/or for one or more mobile apparatuses 20 and/or other computing entities.

Responsive to determining, at block 656, that the instances of crowd-sourced data corresponding to the first time period and the area are not potentially manipulated, the process continues to block 662. At block 662, the network apparatus 10 stores (e.g., in memory 14) and/or provides the updated map data the area (e.g., the map data that was updated based on the instances of crowd-sourced data corresponding to the first time period and the area at block 654). For example, the network apparatus 10 comprises means, such as processor 12, memory 14, communication interface 16, and/or the like for storing and/or providing the updated map data for the area. For example, the stored updated map data may be provided and/or used to perform one or more positioning and/or navigation-related functions by and/or for one or more mobile apparatuses 20 and/or other computing entities.

Continuing to FIG. 7, at block 702, the network apparatus 10 receives instances of crowd-sourced data corresponding to the first time period and the area and stores (e.g., in memory 14) the instances of crowd-sourced data corresponding to the first time period and the area. For example, the network apparatus 10 comprises means, such as processor 12, memory 14, communication interface 16, and/or the like for receiving instances of crowd-sourced data corresponding to the first time period and the area and storing (e.g., in memory 14) the instances of crowd-sourced data corresponding to the first time period and the area. For example, the network apparatus 10 may generate and/or store a database and/or table corresponding to the first time period and the area and update the database and/or table to include the information provided by the received instances of crowd-sourced data corresponding to the first time period and the area. In various embodiments, the network apparatus 10 instances of crowd-sourced data corresponding to a particular time period for the area for at least the particular time period. For example, the network apparatus 10 may store instances of crowd-sourced data corresponding to the current time period and two, three, or more previous time periods. The network apparatus 10 then waits until after determining that the instances of crowd-sourced data for the first time period and the area are not potentially manipulated before updating the map data for the area based on the instances of crowd-sourced data for the first time period and the area.

For example, at block 704, the network apparatus 10 determines whether the instances of crowd-sourced data corresponding to the first time period and the area are potentially manipulated. For example, the network apparatus 10 comprises means, such as processor 12, memory 14, and/or the like, for determining whether the instances of crowd-sourced data corresponding to the first time period and the area are potentially manipulated. For example, in various embodiments, the network apparatus 10 performs blocks 504-510 of FIG. 5 to determine whether the instances of crowd-sourced data corresponding to the first time period and the area are potentially manipulated.

Responsive to determining, at block 704, that the instances of crowd-sourced data corresponding to the first time period and the area are potentially manipulated, the process continues to block 706. At block 706, the network apparatus 10 determines to not update the map data for the area based on the instances of crowd-sourced data corresponding to the first time period and the area. For example, the network apparatus 10 comprises means, such as processor 12, memory 14, and/or the like for determining to not update the map data for the area based on the instances of crowd-sourced data corresponding to the first time period and the area. For example, in an example embodiment, in a scenario where the instances of crowd-sourced data corresponding to the first time period and the area are determined to be potentially manipulated, the map data for the area is not updated based on the instances of crowd-sourced data corresponding to the first time period and the area. For example, the network apparatus 10 determines the mitigated map data for the area to be the map data for the area without any updates based on the instances of crowd-sourced data corresponding to the first time period and the area. For example, the mitigated map data for the area may be the previous version of the map data that is maintained and/or retained from before the first time period.

At block 708, the network apparatus 10 stores (e.g., in memory 14) and/or provides the mitigated map data for the area. For example, the network apparatus 10 comprises means, such as processor 12, memory 14, communication interface 16, and/or the like for storing and/or providing the mitigated map data for the area. For example, the stored mitigated map data may be provided and/or used to perform one or more positioning and/or navigation-related functions by and/or for one or more mobile apparatuses 20 and/or other computing entities.

Responsive to determining, at block 704, that the instances of crowd-sourced data corresponding to the first time period and the area are not potentially manipulated, the process continues to block 710. At block 710, the network apparatus 10 updates the map data for the area based on instances of crowd-sourced data corresponding to the first time period and the area. For example, the network apparatus 10 comprises means, such as processor 12, memory 14, communication interface 16, and/or the like, for updating the map data for the area based on instances of crowd-sourced data corresponding to the first time period and the area.

For example, the network apparatus 10 obtains (e.g., receives and/or accesses) instances of crowd-sourced data corresponding to the first time period and the area and uses one or more map updating techniques to update the map data of the digital map for the area based on the instances of crowd-sourced data corresponding to the first time period and the area. For example, in an example embodiment, the network apparatus 10 receives one or more instances of crowd-sourced data corresponding to the first time period and the area via one or more wired and/or wireless networks 60 and stores (e.g., in memory 14) the instances of crowd-sourced data corresponding to the first time period and the area until after it is determined that the instances of crowd-sourced data corresponding to the first time period and the area are not potentially manipulated. The network apparatus 10 then accesses (e.g., from memory 14) the instances of crowd-sourced data corresponding to the first time period and the area and updates the map data for the area based on an instance of crowd-sourced data corresponding to the first time period and the area. In various embodiments, the network apparatus 10 updates the map data for the area based on the individual instances of crowd-sourced data corresponding to the first time period and the area. In various embodiments, the network apparatus 10 batch processes the instances of crowd-sourced data corresponding to the first time period and the area for updating the map data for the area.

At block 712, the network apparatus 10 stores (e.g., in memory 14) and/or provides the updated map data the area (e.g., the map data that was updated based on the instances of crowd-sourced data corresponding to the first time period and the area at block 654). For example, the network apparatus 10 comprises means, such as processor 12, memory 14, communication interface 16, and/or the like for storing and/or providing the updated map data for the area. For example, the stored updated map data may be provided and/or used to perform one or more positioning and/or navigation-related functions by and/or for one or more mobile apparatuses 20 and/or other computing entities.

In various embodiments, the one or more mitigating actions performed, for example, at block 512, include analyzing and/or processing instances of crowd-sourced data determined to be potentially manipulated to determine a potential type of manipulation. For example, in an example embodiment, the network apparatus 10 analyzes and/or processes instances of crowd-sourced data determined to be potentially manipulated to determine whether the instances of crowd-sourced data were potentially manipulated using constant-position spoofing, constant-offset spoofing, and/or another type of large-area GNSS spoofing and/or jamming. For example, if a notification is provided at block 514, the notification may include information regarding a type of GNSS spoofing and/or jamming that may have been used to potentially manipulate the instances of crowd-sourced data corresponding to the first time period and the area.

FIG. 8 provides a flowchart illustrating various processes, procedures, operations, and/or the like performed by a network apparatus 10 to determine whether the potential manipulation of the instances of crowd-sourced data corresponding to a time period and an area were potentially manipulated using constant-position GNSS spoofing. Starting at block 802, the network apparatus 10 extracts the first location estimates from the instances of crowd-sourced data corresponding to the time period and the area and analyzes the extracted first location estimates using one or more clustering algorithms. For example, the network apparatus 10 comprises means, such as processor 12, memory 14, and/or the like, for extracting the first location estimates from the instances of crowd-sourced data corresponding to the time period and the area and analyzing the extracted first location estimates using one or more clustering algorithms. For example, in various embodiments, the network apparatus 10 may use one or more of k-means clustering, mean-shift clustering, a density-based clustering algorithm, expectation-maximization (EM) clustering using, for example, Gaussian mixture models (GMMs), and/or another clustering algorithm to analyze the extracted first location estimates. In an example embodiment, the clustering algorithm may be performed and/or executed by a machine learning model, artificial neutral network (ANN), and/or the like.

At block 804, the network apparatus 10 identifies any clustering patterns identified via the clustering algorithm. For example, the network apparatus 10 comprises means, such as processor 12, memory 14, and/or the like, for identifying any clustering patterns identified via the clustering algorithm. For example, the network apparatus 10 may determine clustering patterns indicating one or more areas of higher or lower densities of first location estimates than expected (e.g., based on points of interest and/or map data, instances of crowd-sourced data for previous time periods, and/or the like).

In a scenario where no clustering pattern is identified, the network apparatus 10 may determine that the potential manipulation is not caused by constant-location GNSS spoofing.

At block 806, the network apparatus 10 stores and/or provides information regarding any identified clustering patterns and/or an indication that the instances of crowd-sourced data corresponding to the time period and the area were potentially manipulated using constant-location GNSS spoofing. For example, the network apparatus 10 comprises means, such as processor 12, memory 14, communication interface 16, user interface 18, and/or the like for storing and/or providing information regarding any identified clustering patterns and/or an indication that the instances of crowd-sourced data corresponding to the time period and the area were potentially manipulated using constant-location GNSS spoofing. For example, if the network apparatus 10 generates and provides a notification regarding the potential manipulation of instances of crowd-sourced at block 514, the notification may include information regarding any identified clustering patterns and/or an indication that the instances of crowd-sourced data corresponding to the time period and the area were potentially manipulated using constant-location GNSS spoofing.

FIG. 9 provides a flowchart illustrating various processes, procedures, operations, and/or the like performed by a network apparatus 10 to determine whether the potential manipulation of the instances of crowd-sourced data corresponding to a time period and an area were potentially manipulated using constant-offset GNSS spoofing. Starting at block 902, the network apparatus 10 determines respective error vectors for the instances of crowd-sourced data corresponding to the time period and the area. For example, the network apparatus 10 comprises means, such as processor 12, memory 14, and/or the like, for determining respective error vectors for the instances of crowd-sourced data corresponding to the time period and the area. For example, the network apparatus 10 extracts respective first location estimates and respective observation data from the instances of crowd-sourced data corresponding to the time period and the area. The network apparatus 10 uses the map data of the digital map and the respective observation data to determine respective second location estimates. In various embodiments, the respective error vector corresponding to an instance of crowd-sourced data is a vector point from the second location estimate determined based on the respective observation data extracted from the instance of crowd-sourced to the first location estimate extracted from the instance of crowd-sourced (or vice versa). In an example embodiment, the network apparatus 10 determines a respective error vector for a plurality and/or all of the instances of crowd-sourced data corresponding to the time period and the area.

At block 904, the network apparatus 10 identifies and/or determines any error patterns in the respective error vectors. For example, the network apparatus 10 comprises means, such as processor 12, memory 14, and/or the like, for determining and/or identifying any error patterns in the respective error vectors. For example, the network apparatus 10 may analyze the respective error vectors using one or more clustering algorithms to identify one or more error patterns in the respective error vectors. For example, in an example scenario, the network apparatus 10 may determine that instances of crowd-sourced data including a first location estimate in a particular portion of the area tend to have error vectors that shift the first location estimate one kilometer to the west of the corresponding second location estimate. Thus, at least in the identified portion of the area, the instances of crowd-sourced data are potentially manipulated by constant-offset spoofing. In various embodiments, various pattern finding techniques and/or algorithms may be used to identify and/or determine one or more error patterns in the respective error vectors. In an example embodiment, error patterns are identified in the respective error vectors using one or more clustering algorithms or other pattern identifying algorithms that are performed and/or executed by respective machine learning models, ANNs, and/or the like.

In various embodiments, at block 906, the network apparatus 10 determines one or more location corrections based on the identified and/or determined error pattern(s). For example, the network apparatus 10 comprises means, such as processor 12, memory 14, and/or the like, for determining one or more location corrections based on the identified and/or determined error pattern(s). For example, in the example provided above where an error pattern was identified that indicated the first location estimates were shifted west by one mile, a location correction may be determined that indicates that the first location estimates may be corrected by shifting the first location estimates to the east by one mile. For example, a location correction is configured to, when applied to a first location estimate, substantially correct the error in the first location estimate. For example, in an example embodiment, a location correction for an identified cluster of respective error vectors may be the negative of the average of the respective error vectors in the identified cluster.

In an example embodiment, the network apparatus 10 may determine a confidence level for a location correction. For example, the larger the variation among the respective error vectors in an identified cluster of respective error vectors the lower the confidence level for a location correction determined based on the respective error vectors in the identified cluster may be. For example, the confidence level for a location correction may be inversely proportional to the uncertainty in the location correction.

In various embodiments, at block 908, the network apparatus 10 generates respective corrected location estimates for respective instances of crowd-sourced data corresponding to the time period and the area using the one or more location corrections. For example, the network apparatus 10 comprises means, such as processor 12, memory 14, and/or the like for generating respective corrected location estimates for respective instances of crowd-sourced data corresponding to the time period and the area using the one or more location corrections. For example, continuing with the example from above where the location correction was determined to be shifting the first location one mile to the east, the network apparatus 10 may determine a respective corrected location estimate for one or instances of crowd-sourced data corresponding to the time period and the area using the location correction by shifting the first location one mile to cast.

In an example embodiment, the network apparatus 10 determines whether the confidence level for a location correction satisfies one or more confidence threshold criteria (e.g., is greater than a threshold confidence) before using the location correction to determine respective corrected location estimates. For example, responsive to the network apparatus 10 determining that the confidence level for a location correction satisfies one or more confidence threshold criteria (e.g., is greater than a threshold confidence), the network apparatus 10 uses the location correction to determine respective corrected location estimates. Responsive to the network apparatus 10 determining that the confidence level for a location correction does not satisfy one or more confidence threshold criteria (e.g., is not greater than a threshold confidence), the network apparatus 10 does not use the location correction to determine respective corrected location estimates.

In various embodiments, at block 910, the network apparatus 10 updates the map data for the area (e.g., the mitigated map data) using respective corrected location estimates and corresponding instances of crowd-sourced data. For example, the network apparatus 10 comprises means, such as processor 12, memory 14, and/or the like, for updating the map data for the area (e.g., the mitigated map data) using respective corrected location estimates and corresponding instances of crowd-sourced data. For example, the map data may be updated based on an instance of crowd-sourced data where the first location estimate of the instance of crowd-sourced data is replaced with the corresponding respective corrected location estimate.

For example, the network apparatus 10 uses one or more map updating techniques to update the map data of the digital map for the area based on the instances of crowd-sourced data and the corresponding respective corrected location estimates. The network apparatus 10 stores (e.g., in memory 14) and/or provides the updated map data for the area. For example, the stored updated map data may be provided and/or used to perform one or more positioning and/or navigation-related functions by and/or for one or more mobile apparatuses 20 and/or other computing entities.

III. Technical Advantages

Conventional techniques for updating a digital map based on crowd-sourced data include receiving instances of crowd-sourced data and updating a digital map based on the crowd-sourced data. However, in such conventional techniques, it may not be known whether the crowd-sourced data is potentially manipulated or not. When potentially manipulated crowd-sourced data is used to update the digital map, errors may be introduced into the location or characteristics of various observed features. For example, when an instance of manipulated crowd-sourced data indicates an observed feature has a particular characteristic (e.g., a particular observed signal strength at a manipulated location estimate or a particular size or position when viewed from the manipulated location estimate) the particular characteristic of the feature may be misrepresentative of the actual characteristic of the feature. However, this misrepresentation of the feature may be added to the digital map. Therefore, technical problems exist regarding how to mitigate the effects of manipulation, such as large-area GNSS spoofing and/or jamming on crowd-sourced data and digital maps that are updated based on crowd-sourced data.

Various embodiments provide technical solutions to these technical problems. For example, in various embodiments, instances of crowd-sourced data corresponding to a time period and an area are obtained by, for example, a server or Cloud-based computing resource. Each instance of crowd-sourced data includes a respective location estimate and observation data. A respective corroboration score is determined for each instance of crowd-sourced data based on how well the respective location estimate and observation data of the respective instance of crowd-sourced data corroborates or agrees with the map data of the digital map. A representative corroboration score for the time period and the area is determined based on the respective corroboration scores. In response to determining that the representative corroboration score for the time period and the area indicates significantly or substantially poorer corroboration and/or agreement between the instances of crowd-sourced data of the time period and the digital map compared to one or more previous time periods, it is determined that the instances of crowd-sourced data are potentially manipulated. For example, if the representative corroboration score indicates a degradation in the corroboration and/or agreement between instances of crowd-sourced data captured/generated in a first time period compared to previous time periods, it is determined that potential manipulation of GNSS signals (e.g., spoofing and/or jamming) may have occurred in the area during the first time period.

Responsive to determining that instances of crowd-sourced data captured and/or generated during a first time period in an area are potentially manipulated, actions may be taken to mitigate the effects on a digital map updated based on crowd-sourced data. For example, the digital map may be reverted back to a version of the digital map from before the instances of crowd-sourced data captured and/or generated during the first time period in the area were used to update the map. In another example, the digital map may not be updated based on the instances of crowd-sourced data captured and/or generated during the first time period in the area until after it is determined that the instances of crowd-sourced data are not potentially manipulated. Various embodiments, therefore, provide more accurate digital maps by reducing artifacts and/or errors introduced into the digital map through potentially manipulated crowd-sourced data (e.g., crowd-sourced data where the location estimates are potentially manipulated through large-area GNSS spoofing and/or jamming).

Therefore, various embodiments provide improvements to the technical fields of digital map generation and updating using crowd-sourced data.

IV. Example Apparatus

The network apparatus 10 and/or mobile apparatus 20 of an example embodiment may be embodied by or associated with a variety of computing devices including, for example, a navigation system including a global navigation satellite system (GNSS), a cellular telephone, a mobile phone, a personal digital assistant (PDA), a watch, a camera, a computer, an Internet of things (IoT) item, and/or other device that can observe an environment (e.g., a radio environment such as radio frequency signals from radio nodes and/or access points 40, a visual environment such as visual features, and/or the like) in the vicinity of the computing device. Additionally or alternatively, the network apparatus 10 and/or mobile apparatus 20 may be embodied in other types of computing devices, such as a server, a personal computer, a computer workstation, a laptop computer, a plurality of networked computing devices or the like, that are configured to capture and provide instances of crowd-sourced data, update map data based on instances of crowd-sourced data, and/or the like. In an example embodiment, a mobile apparatus 20 is a smartphone, tablet, laptop, PDA, and/or other mobile computing device and a network apparatus 10 is a server that may be part of a Cloud-based computing asset and/or processing system.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or mobile apparatus 20 may be embodied by a computing entity and/or device. However, in some embodiments, the network apparatus 10 and/or mobile apparatus 20 may be embodied as a chip or chip set. In other words, the network apparatus 10 and/or mobile apparatus 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or mobile apparatus 20 may include a user interface 18, 28 that may, in turn, be in communication with the processor 12, 22 to provide output to the user, such as one or more navigable routes to a destination location and/or from an origin location, display of location dependent and/or triggered information, and/or the like, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or mobile apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network apparatus 10 and/or mobile apparatus 20 may comprise a component (e.g., memory 14, 24, and/or another component) that stores a digital map (e.g., in the form of a geographic database) comprising a first plurality of data records, each of the first plurality of data records representing a corresponding traversable map element (TME). At least some of said first plurality of data records map information/data indicate current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location, a radio-based position estimate) to a point on a map, a lane of a lane network, and/or link, one or more localization features and a corresponding location of each localization feature, and/or the like. For example, the geographic database may comprise a positioning map comprising an access point registry and/or instances of network access point information corresponding to various network access points. For example, a geographic database may include road segment, segment, link, lane segment, or TME data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, pedestrian walkways, elevators, staircases, radio nodes and/or access points 40 or other observable features, and/or the like and/or the corresponding data records (e.g., to add or update updated map information/data including, for example, current traffic conditions along a corresponding TME; assign and/or associate an access point with a TME, lateral side of a TME, and/or representation of a building; and/or the like), a localization layer (e.g., comprising localization features), a registry of access points to identify mobile access points, and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network and/or other traversable network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

V. Apparatus, Methods, and Computer Program Products

As described above, FIGS. 4, 5, 6A, 6B, 7, 8, and 9 illustrate flowcharts of a network apparatus 10 and/or mobile apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
obtaining, by at least one processor, one or more instances of crowd-sourced data corresponding to a first time period, wherein a respective instance of crowd-sourced data of the one or more instances of crowd-sourced data was generated by a respective mobile apparatus during the first time period, and the respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus;
for each of the one or more instances of crowd-sourced data, determining, by the at least one processor, a respective corroboration score based at least in part on map data stored in a memory accessible to the at least one processor and at least one of the respective first location estimate or the observation data of the respective instance of crowd-sourced data;
determining, by the at least one processor, a first representative corroboration score for the first time period based on respective corroboration scores determined for the one or more instances of crowd-sourced data corresponding to the first time period;
comparing, by the at least one processor, the first representative corroboration score for the first time period to a second representative corroboration score corresponding to a second time period, wherein the first time period is different from the second time period; and
based on a result of comparing the first representative corroboration score and the second representative corroboration score, determining, by the at least one processor, whether one or more respective first location estimates of the one or more instances of crowd-sourced data are potentially manipulated; and
responsive to determining that the one or more respective first location estimates of the one or more instances of crowd-sourced data are potentially manipulated, performing, by the at least one processor, at least one of (a) preventing the use of the one or more instances of crowd-sourced data from being used to update the map data or (b) reverting an effect of using the one or more instances of crowd-source data to update the map data.

2. The method of claim 1, wherein the respective corroboration score for the respective instance of crowd-sourced data is determined at least in part based on a cross-validation between the respective first location estimate and a second location estimate determined at least in part based on the map data and the observation data of the respective instance of crowd-sourced data.

3. The method of claim 1, wherein the respective corroboration score for the respective instance of crowd-sourced data is determined at least in part based on a cross-validation between at least a portion of the observation data of the respective instance of crowd-sourced data corresponding to a particular feature and map data corresponding to the feature.

4. The method of claim 1, wherein the first representative corroboration score is determined based on a first distribution of respective corroboration scores and the second representative corroboration score was determined based on a second distribution of respective corroboration scores that were determined for respective instances of crowd-sourced data corresponding to the second time period.

5. The method of claim 4, wherein the at least one processor determines that the one or more respective first location estimates of the one or more instances of crowd-sourced data are potentially manipulated responsive to determining that the first representative corroboration score indicates substantially less corroboration between the map data and the at least one of the first location estimate or the observation data of the one or more instances of crowd-sourced data corresponding to the first time period than the second representative corroboration score.

6. The method of claim 5, wherein determining that the first representative corroboration score indicates substantially less corroboration between the map data and the at least one of the first location estimate or the observation data of the one or more instances of crowd-sourced data corresponding to the first time period than the second representative corroboration score comprises at least one of (a) determining that the first representative distribution score and the second representative distribution score are statistically different from one another or (b) determining that the first distribution of corroboration scores is a statistically different distribution from the second distribution of corroboration scores.

7. The method of claim 1, wherein the at least one processor determines that the one or more respective first location estimates of the one or more instances of crowd-sourced data are potentially manipulated responsive to determining that a difference between the first representative corroboration score and the second representative corroboration score satisfies a threshold requirement.

8. The method of claim 1, wherein the first time period and the second time period are non-overlapping periods of time.

9. The method of claim 1, wherein the one or more instances of crowd-sourced data correspond to a common defined geographical area.

10. The method of claim 1, wherein the observation data is a radio fingerprint corresponding to observation of one or more radio nodes observed by a radio interface of the respective mobile apparatus.

11. The method of claim 1, wherein performing, by the at least one processor, at least one of (a) preventing the use of the one or more instances of crowd-sourced data from being used to update the map data or (b) reverting an effect of using the one or more instances of crowd-source data to update the map data comprises at least one of:
reverting the map data to a state of the map data prior to the beginning of the first time period; or
waiting until after a determination of whether one or more respective first location estimates of the one or more instances of crowd-sourced data are potentially manipulated before using the one or more instances of crowd-sourced data to update the map data and not using the one or more instances of crowd-sourced data to update the map data responsive to determining that the one or more respective first location estimates are potentially manipulated.

12. The method of claim 1, further comprising, responsive to determining that the one or more respective first location estimates of the one or more instances of crowd-sourced data are potentially manipulated, providing a notification of potential manipulation of location estimates to an authority computing entity or a media computing entity.

13. The method of claim 1, further comprising, responsive to determining that the one or more respective first location estimates of the one or more instances of crowd-sourced data are potentially manipulated, determining whether to provide a notification based at least in part on one or more received reports of potential manipulation generated by respective mobile devices during the first time period; and
responsive to determining to provide the notification, providing the notification of potential manipulation of location estimates to an authority computing entity or a media computing entity.

14. The method of claim 1, further comprising analyzing respective first location estimates of the one or more instances of crowd-sourced data using a clustering algorithm to identify one or more areas associated with the potential manipulation of the one or more respective first location estimates.

15. The method of claim 1, further comprising:
determining respective error vectors based on the respective first location estimates of the one or more instances of crowd-sourced data corresponding to the first time period and respective second location estimates determined at least in part based on the map data and the observation data of the one or more instances of crowd-sourced data; and
determining one or more error patterns based on analyzing the respective error vectors.

16. The method of claim 15, further comprising:
generating a location estimate correction based on the one or more error patterns;
generating respective corrected location estimates by correcting the respective first location estimates of the one or more instances of crowd-sourced data corresponding to the first time period based on the location estimate correction; and
generating updated map data using the respective corrected location estimates and the one or more instances of crowd-sourced data.

17. The method of claim 1, further comprising, responsive to determining that the respective instance of crowd-sourced data comprises an indication of an expected potentially poor corroboration between the respective instance of crowd-sourced data and the map data, excluding the respective instance of crowd-sourced data from a determination of the first representative corroboration score.

18. The method of claim 1, wherein the one or more respective first location estimates of the one or more instances of crowd-sourced data are potentially manipulated via global navigation satellite system (GNSS) spoofing or jamming.

19. An apparatus comprising at least one processor and at least one memory storing computer program instructions, the at least one memory and the computer program instructions are configured to, with the processor, cause the apparatus to at least:

obtain one or more instances of crowd-sourced data corresponding to a first time period, wherein a respective instance of crowd-sourced data of the one or more instances of crowd-sourced data was generated by a respective mobile apparatus during the first time period, and the respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus;

for each of the one or more instances of crowd-sourced data, determine a respective corroboration score based at least in part on map data stored in a memory accessible to the at least one processor and at least one of the respective first location estimate or the observation data of the respective instance of crowd-sourced data;

determine a first representative corroboration score for the first time period based on respective corroboration scores determined for the one or more instances of crowd-sourced data corresponding to the first time period;

compare the first representative corroboration score for the first time period to a second representative corroboration score corresponding to a second time period, wherein the first time period is different from the second time period; and based on a result of comparing the first representative corroboration score and the second representative corroboration score, determine whether one or more respective first location estimates of the one or more instances of crowd-sourced data are potentially manipulated; and responsive to determining that the one or more respective first location estimates of the one or more instances of crowd-sourced data are potentially manipulated, perform at least one mitigating action.

20. A computer program product comprising at least one non-transitory computer-readable storage medium having computer-readable program instruction portions stored therein, the computer-readable program instruction portions comprise executable portions configured, when executed by a processor of an apparatus, to cause the apparatus to:

obtain one or more instances of crowd-sourced data corresponding to a first time period, wherein a respective instance of crowd-sourced data of the one or more instances of crowd-sourced data was generated by a respective mobile apparatus during the first time period, and the respective instance of crowd-sourced data comprises (a) a respective first location estimate indicating a location of the respective mobile apparatus when the mobile apparatus generated the instance of crowd-sourced data and (b) respective observation data corresponding to sensor data captured by one or more sensors of the mobile apparatus;

for each of the one or more instances of crowd-sourced data, determine a respective corroboration score based at least in part on map data stored in a memory accessible to the at least one processor and at least one of the respective first location estimate or the observation data of the respective instance of crowd-sourced data;

determine a first representative corroboration score for the first time period based on respective corroboration scores determined for the one or more instances of crowd-sourced data corresponding to the first time period;

compare the first representative corroboration score for the first time period to a second representative corroboration score corresponding to a second time period, wherein the first time period is different from the second time period; and based on a result of comparing the first representative corroboration score and the second representative corroboration score, determine whether one or more respective first location estimates of the one or more instances of crowd-sourced data are potentially manipulated; and responsive to determining that the one or more respective first location estimates of the one or more instances of crowd-sourced data are potentially manipulated, perform at least one mitigating action.

\* \* \* \* \*